(12) United States Patent
Burns et al.

(10) Patent No.: US 10,740,326 B2
(45) Date of Patent: Aug. 11, 2020

(54) SYSTEM FOR SUGGESTING NETWORK RESOURCE FOR USE BY A NETWORK TERMINAL BASED ON NETWORK RESOURCE RANKING

(71) Applicant: Hewlett-Packard Development Company, L.P., Houston, TX (US)

(72) Inventors: Mark Burns, Ayr (CA); Michael St. Laurent, Baden (CA); Dharmesh Krishnammagaru, Kitchener (CA)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 16/211,797

(22) Filed: Dec. 6, 2018

(65) Prior Publication Data

US 2019/0108168 A1    Apr. 11, 2019

Related U.S. Application Data

(63) Continuation of application No. 14/200,558, filed on Mar. 7, 2014, now abandoned.

(51) Int. Cl.
*G06F 16/24* (2019.01)
*H04L 29/08* (2006.01)
(Continued)

(52) U.S. Cl.
CPC ............ *G06F 16/24* (2019.01); *G06F 3/1204* (2013.01); *G06F 3/1287* (2013.01);
(Continued)

(58) Field of Classification Search
None
See application file for complete search history.

(56) References Cited

U.S. PATENT DOCUMENTS 6,223,158 B1 * 4/2001 Goldberg ............... G10L 15/08
704/252
7,424,532 B1    9/2008 Subbiah
(Continued)

*Primary Examiner* — Alex Gofman
*Assistant Examiner* — Umar Mian
(74) *Attorney, Agent, or Firm* — HP Inc. Patent Department

(57) ABSTRACT

A network resource access system for providing access by a user to network resources over a communications network, the system comprising: a resource registry including stored resource records associated with each of the network resources and a stored user profile containing a list of network resources such that the network resources have a ranking relative to each other based at least in part on user behavior with respect to usage of each of the network resources, the user profile associated with the user such that the list of network resources contains the network resources previously accessed by the user; and a resource service for receiving an access query from a network terminal identifying the user and associated with submission of application data for processing by a selected network resource from the list, the resource service further configured for accessing the user profile to identify a suggested network resource from the list in view of the relative ranking and for sending identification of the suggested network resource to the network terminal in response to the access query.

12 Claims, 12 Drawing Sheets

(51) Int. Cl.
*G06F 16/2457* (2019.01)
*G06F 3/12* (2006.01)
*G06F 16/248* (2019.01)
*G06F 16/29* (2019.01)

(52) U.S. Cl.
CPC .......... *G06F 3/1288* (2013.01); *G06F 16/248* (2019.01); *G06F 16/24578* (2019.01); *G06F 16/29* (2019.01); *H04L 67/16* (2013.01); *H04L 67/18* (2013.01); *H04L 67/306* (2013.01)

(56) References Cited

U.S. PATENT DOCUMENTS

| | | |
|---|---|---|
| 7,814,229 B1 | 10/2010 | Cabrera |
| 8,209,390 B1 | 6/2012 | Gibbs et al. |
| 2003/0236854 A1 | 12/2003 | Rom et al. |
| 2004/0158654 A1* | 8/2004 | Shima ................ H04N 1/32545 710/8 |
| 2007/0143449 A1* | 6/2007 | Wray West ........... H04M 1/247 709/219 |
| 2008/0155386 A1 | 6/2008 | Jensen |
| 2009/0210533 A1 | 8/2009 | Verhaegh et al. |
| 2010/0130240 A1* | 5/2010 | Hart ...................... H04W 8/005 455/509 |
| 2010/0257580 A1 | 10/2010 | Zhao |
| 2011/0131224 A1* | 6/2011 | Bodin ................... G06Q 30/02 707/758 |
| 2011/0208864 A1 | 8/2011 | St. Laurent et al. |
| 2012/0210226 A1 | 8/2012 | Mccoy et al. |
| 2013/0024508 A1 | 1/2013 | Sathish et al. |
| 2013/0080242 A1 | 3/2013 | Alhadeff et al. |
| 2013/0086108 A1 | 4/2013 | Ramaswamy et al. |
| 2014/0047048 A1 | 2/2014 | Ail et al. |
| 2014/0089410 A1 | 3/2014 | Ahmed |
| 2014/0164519 A1 | 6/2014 | Shah |
| 2014/0258450 A1* | 9/2014 | Suryanarayanan ......................... H04L 67/1097 709/217 |
| 2014/0317268 A1* | 10/2014 | Hughes ................ H04L 12/281 709/224 |
| 2015/0106366 A1 | 4/2015 | Stuttle et al. |

* cited by examiner

SYSTEM FOR SUGGESTING NETWORK RESOURCE FOR USE BY A NETWORK TERMINAL BASED ON NETWORK RESOURCE RANKING

FIELD

The present invention relates to a method and system for facilitating access of network resources for application data processing.

BACKGROUND

Local area networks are widely used as a mechanism for making available computer resources, such as file servers, scanners, and printers, to a multitude of computer users. Wide area networks, such as the Internet, have evolved as a mechanism for providing distributed computer resources without regard to physical geography. Recently, the Internet Print Protocol ("IPP") has emerged as a mechanism to control access to printing resources over the Internet.

However, there exists disadvantages in prior art systems for providing appropriate network resources to a user based on changing circumstances of the user, where those network resources can be accessible to the user via one or more extranets, intranets and/or different geographical locations. This problem of determining an appropriate network resource that is acceptable to the user for a given circumstance can be exacerbated by having to continually scan by the user's network terminal for available network resources when the user wishes to change from one network resource to another based on changes in user operation of the network terminal, such as change in physical location of the user, change in network location of the network terminal, etc.

SUMMARY

According to the invention, there is provided a network resource access system and a method of network resource access which addresses at least one deficiency of the prior art network resource access systems.

A first aspect provided is a network resource access system for providing access by a user to network resources over a communications network, the system comprising: a resource registry including stored resource records associated with each of the network resources and a user profile containing a list of network resources such that the network resources have a ranking relative to each other based at least in part on a user state with respect to usage f each of the network resources, the user profile associated with the user such that the list of network resources contains the network resources previously accessed by the user; and a resource service for receiving an access query from a network terminal identifying the user and associated with submission of application data for processing by a selected network resource from the list, the resource service further configured for accessing the user profile to identify a suggested network resource from the list in view of the relative ranking and for sending identification of the suggested network resource to the network terminal in response to the access query.

A further aspect is where the resource service is configured to dynamically determine the ranking of each of the network resources based on a plurality of resource parameters associated with at least one of the application data, the user, or an operational characteristic of one or more of the network resources.

A further aspect is where the ranking is a weighted combination of the plurality of resource parameters based on a weight assigned to each of the resource parameters. A resource parameter of the plurality of resource parameters is a frequency of usage of each of the network resources by the user.

A further aspect is where the resource service is configured for updating the frequency of usage of the suggested network resource when selected by the user.

A further aspect is a method for providing access of a user to network resources over a communications network, the method comprising: receiving an access query from a network terminal associated with the user and associated with submission of application data for processing by a network resource of the network resources; accessing a resource registrY including stored resource records associated with each of the network resources and a user profile containing a list of network resources such that the network resources have a ranking relative to each other based at least in part on user behaviour with respect to usage of each of the network resources, the user profile associated with the user such that the list of network resources contains the network resources previously accessed by the user; accessing the user profile to identify a suggested network resource from the list in view of the relative ranking; and sending identification of the suggested network resource to the network terminal in response to the access query.

A further aspect is a network resource access system for providing access by a user to network resources over a communications network, the system comprising: a resource registry including stored resource records associated with each of the network resources; a stored user profile accessible to a resource application on the network terminal, the user profile containing a list of network resources such that the network resources have a ranking relative to each other based at least in part on user behaviour with respect to usage of each of the network resources, the user profile associated with the user such that the list of network resources contains the network resources previously accessed by the user; and the resource application on a network terminal for processing an access query of the network terminal associated with the user and associated with submission of application data for processing by a selected network resource from the list, the resource application further configured for accessing the user profile to identify a suggested network resource from the list in view of the relative ranking and for sending identification of the suggested network resource to a user interface of the network terminal.

BRIEF DESCRIPTION OF THE DRAWINGS

The preferred embodiment of the invention will now be described, by way of example only, with reference to the drawings, in which.

DETAILED DESCRIPTION OF THE PREFERRED EMBODIMENT

Network Resource Access System 100

Figure 1:
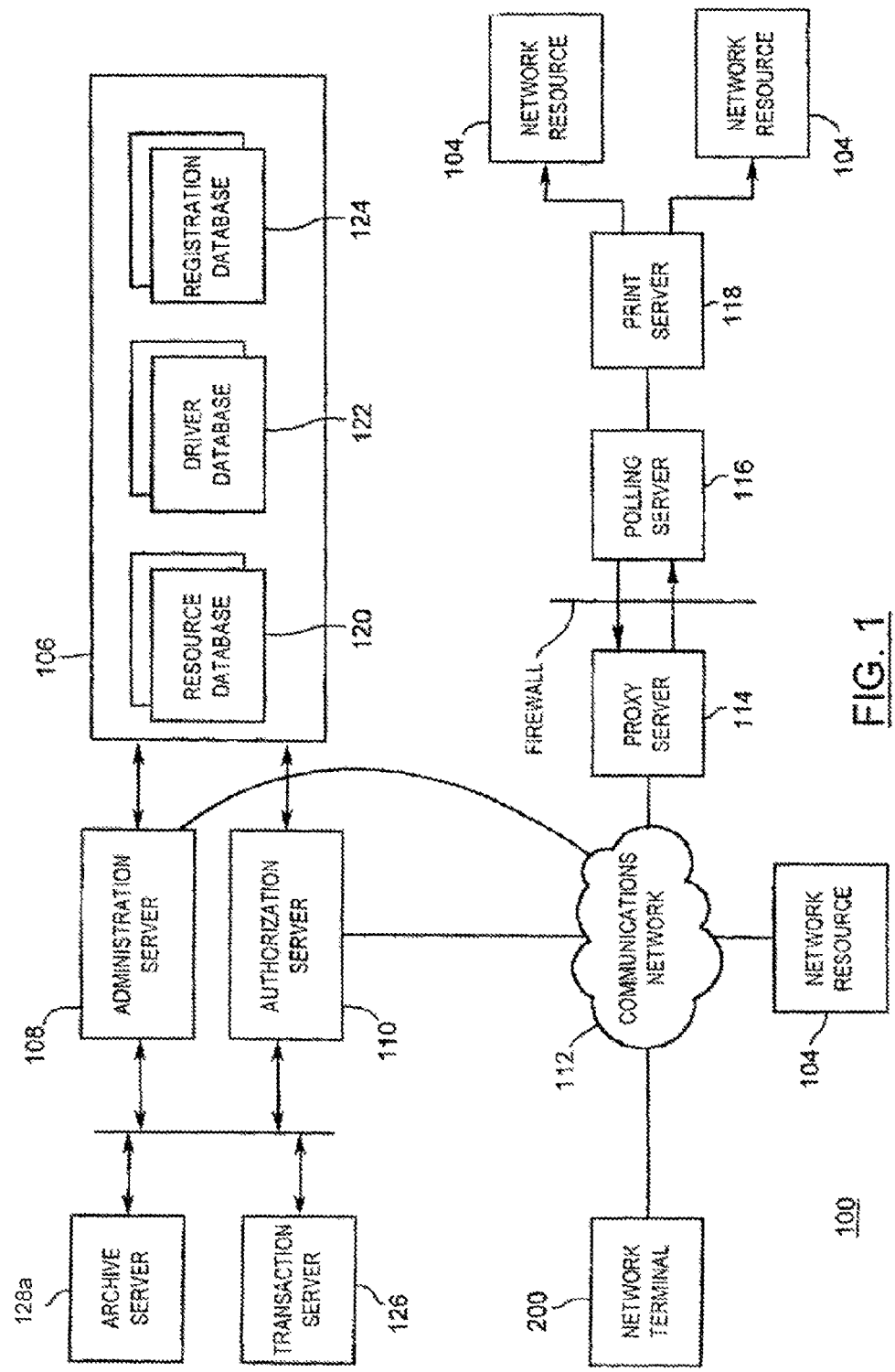
FIG. 1 is a schematic view of the network resource access system, according to the present invention, showing the network terminals, the network resources, the resource registry, the authorization server, the administration server, the proxy server, and the polling server.

Turning to FIG. 1, a network resource access system, denoted generally as 100, is shown comprising network terminals 200 (e.g. mobile communication device such as a smart phone) configured to submit network resource requests 220 to one or more network resources 104 (e.g. network printer) available over a communications network 112, a resource registry 106 storing a number of resource records 300 defining the network resources 104 and user profiles 4SO (see Figure Sa) defining a number of resource parameters 456 associated with network resource 104 usage by the user, an administration server 108 for administering contents of the resource registry 106 and/or registration of the network terminal 200 users with the system 100, and an authorization server 110 for providing access to the users of selected network resource(s) 104 of the system and/or registration of the network terminal 200 users with the system 100. Typically, the network resource access system 100 comprises a plurality of network terminals 200, and a plurality of network resources 104 coupled together via a communications network 112, however for enhanced clarity of discussion, FIG. 1 only shows a single network terminal 200 and multiple network resources 104 available for selection by the user and/or for suggestion (based on a ranking system) by the authorization server 11O to the network terminal 200, as further described below. The suggestion of a particular network resource 104 to the user of the network terminal 200 by the authorization server 11O (or the client application 390) can be based on the resource parameters 4S6 (stored in the user profile 450 such as last network resource 104, most frequent network resource 104 used, etc. and/or contained in a resource access request 220, see Figure Sa, such as geographic location of the network terminal 104, current network 112 segment to which network terminal 200 is connected, etc.).

It is recognised the server functionality of the administration server 108 and the authorization server 110 can be provided interchangeably by either server 108, 110 for facilitating the interaction of access and/or usage of the network resources 104 by the network terminals 200, via the system 100. Example server functionality can include registration of the user with the system 100, access request 220 receipt and processing, response communications 220 formulated and sent to the network terminal 200 and/or to a building server 116,118 associated with the network resource 104, etc. It is also recognised that the authorization server 110 and the administration server 108 can be hosted services on one physical computer or subdivided as services hosted on two or more separate computers (e.g. in communication with one another via the communications network 112), as desired.

The authorization server 110 is configured to communicate with the network terminal 200 via the network 112, for example where a network resource application 390 (see FIG. 6) is configured as a client (e.g. registered) of the authorization server 110. As such, the authorization server 110 (or the client application 390, also referred to as a resource application 390 if acting independently for one or more functions in determining the suggested network resource 104) can have access to the user profile 450, via the resource registry 106, which defines ranking 454 of various network resource IDs 402 (of the various network resources 104 described/defined in resource records 300) according to one or more applicable ranking parameters 456 further defined below. Based on the rankings (e.g. determined dynamically, statically, or both), the authorization server 110 (or the client application 390) can provide a suggested network resource 104 (e.g. as identified by a network resource ID 452 corresponding with the network resource 104 listed in the resource records 300) in response to a network resource access request 220 (e.g. printer access request), for example submitted to the authorization server 110 via the client application 390. Any access request 220 can also include network resource parameters 456 as well (e.g. paper size selection, colour printer requirements, etc.) for use in determining the network resource 104 suggestion (e.g. response communication 220). It is recognised that application 390 can be referred to as a client application in those contexts in which it is interacting with the resource service 458 and can also be referred to as a resource application in those contexts in which it is interacting with the user profile 450 stored in local memory 224 of the network terminal 200.

It is recognised that in some cases, the user may not be part of the decision making process for network resource 104 suggestion other than the fact that user has the network device 200 in hand. In some cases permissions (e.g. authorized access to private or restricted access network resources 104) can be relevant as a factor in determining the suggested network resource 104 by the resource access service 458 but in others (such as a hotel or other public place) permissions may be anonymous and the network device's 200 location and capabilities may be given greater weight in determining the suggested network resource 104 by the resource access service 458.

As further described below, the authorization server 110 (or the client application 390) can access the resource records 300 of the resource registry 106 to determine alternative or additional network resources 104 that are not contained in the user profile 450, based on the resource parameters 456 of the access request 220. For example, the user could have only used black and white printers in the past (represented as a list of one or more black and white configured printers listed/named by the resource IDs 452 in the user profile 450, for example Resource 101 could be a work printer, Resource 102 could be a home printer, and Resource 103 could be a hotel lobby printer). When the user submits the access request 220 containing a resource parameter 456 of colour printer, the authorization server 110 could determine that the current list of network resources 104 of the user profile 450 does not contain a colour enabled printer 104 and therefore search the resource registry records 300 for a network resource 104 compatible with the resource parameter 456 of colour printer. It is recognised that other resource parameters 456 of the user profile 450 could also be used to select appropriate network resource 104 matches from the network resource registry 106, based on checking the resource records 300 of each network resource 104 listed in the resource registry 106 with the resource parameters 456 obtained from the access request 220 and/or the user profile 450.

It is recognised that the location of the user profile 450 can be stored on the network device 200 (e.g. in memory 224). The user profile 450 could also reside in the memory of the authorization server 110 (e.g. memory 224) for direct access by the resource access service 458. The user profile 450 could also be independent and reside in the resource registry 106. It is recognised that the user profile 450 could be in any one location, e.g. network device 200 or authorization server 110, or resource registry 106, could be shared across a pair of locations (e.g. network device 200 and authorization server 110 or resource registry 106), or could be shared across all of the locations. It is described only by example that the user profile 450 is in the resource registry 106, however it is recognised that the user profile 456 could be stored on device of the network terminal 200 and used by the network terminal application client 390 to make a determination of the suggested. network resource 104 on behalf of the resource access service 458, e.g. the client application 390 can also have some or all of the resource access service 458 functionality to analyze the resource access request 220 contents, the user profile 450 contents and any network terminal 200 capabilities (e.g. location) as part of determining the user access state and comparing that to the network terminals 104 listed in the user profile 450 stored on the network terminal 200. Also envisioned is that if the client application 390 cannot make a proper determination for a suggested network resource 104 on its own, then the client application 390 can request of the resource access service 458 for additional details of available network resources 104 (e.g. from the user profile 450 contents stored on the authorization server 110 and/or in the resource registry 106, and/or accessed n the records 300 of the resource registry 106).

As such, the user of the network terminal 200 is provided with the suggested network resource 104 by the authorization server 110, upon inspection of the user profile 450 (and optionally resource records 300) in view of factors of a user resource access state, in order to make a determination of the which network resource 104 to suggest to the user. User access state can be defined as including one or more factors of: network accessibility of the network terminal 200; capabilities of the network resource 104 in view of requirements to process the application data 221 of the resource request 220; user behaviour such as last or most frequent network resource 104 used, most frequent network resource 104 for a specific location (e.g. geographical, network, etc.); other user profile 450 parameters 456; service/network accessibility of the network terminal 200 to the network resource 104; service capabilities of the network resource 104 for application data 221 processing; etc.

When a new network resource 104 (e.g. identified in the resource records 300 and not in the user profile record 450) is determined by the authorization server 110 (or the client application 390) to be the most suitable match for the access request 220, the authorization server 110 could forward the corresponding resource ID 452 obtained from the resource records 300 to the network terminal 200 in the access response 220 along with optionally any other network resource 104 information (e.g. physical location, cost, etc.). If selected and used by the user of the network terminal 200, then the authorization server 110 (or the client application 390) would update the user profile 450 with the additional resource ID 452 of the newly used network resource 104 (i.e. the new resource ID 456 would be added to the list of resource IDs and would also receive an associated ranking 454 with respect to all of the other ranked resource IDs of the user profile 450.

Alternatively, when a new network resource 104 (e.g. identified in the resource records 300 and not in the user profile record 450) is determined by the client application 390 to be the most suitable match for the access request 220, the client application 390 would receive the corresponding resource ID 452 obtained from the resource records 300 along with optionally any other network resource 104 information (e.g. physical location, cost, etc.). If selected and used by the user of the network terminal 200, then the client application 390 could update the user profile 450 with the additional resource ID 452 of the newly used network resource 104 (i.e. the new resource ID 456 would be added to the list of resource IDs and would also receive an associated ranking 454 with respect to all of the other ranked resource IDs of the user profile 450.

As such, it is recognised that the determination for the suggested network resource 104 need not be done by the resource service 458, as in some cases the client application 390 can provide independent, or additional determinations and then use the resource registry 106 to retrieve more information or a list of network resources 104 from which to obtain the suggested network resource 104 used to submit the application data 221 for processing. It is recognised that there can be one or more determination actors (e.g. resource service 458, client application 390, etc.) for identifying the suggested network resource 104. For example an initial determination (trying to match the user state—represented for example by the access request 220—with one or more network resources 104 contained in the user profile 450) by the client application 390, whereby if the determination of the suggested network resource 104 is not suitable as a result of the initial determination then the client application 390 can send the access request 220 to the resource service 458 requesting a suggested network resource 104 or if there are alternative network resources 104 to match the user state other than the network resources 104 identified in the initial determination done by the client application 390.

For example, the mobile device application 390 can do the first (e.g. initial) determination, filter our unwanted network resources 104 and then refer to the authorization server 110 for a second determination for additional or alternative suggested network resource(s) 104 based on matching done by the resource service 458. For example, the resource service 458 can do the first (e.g. initial) determination, filter our unwanted network resources 104 and then refer to the network terminal 200 for a second determination for additional or alternative suggested network resource(s) 104 based on matching done by the mobile device application 390.

Figure 8:
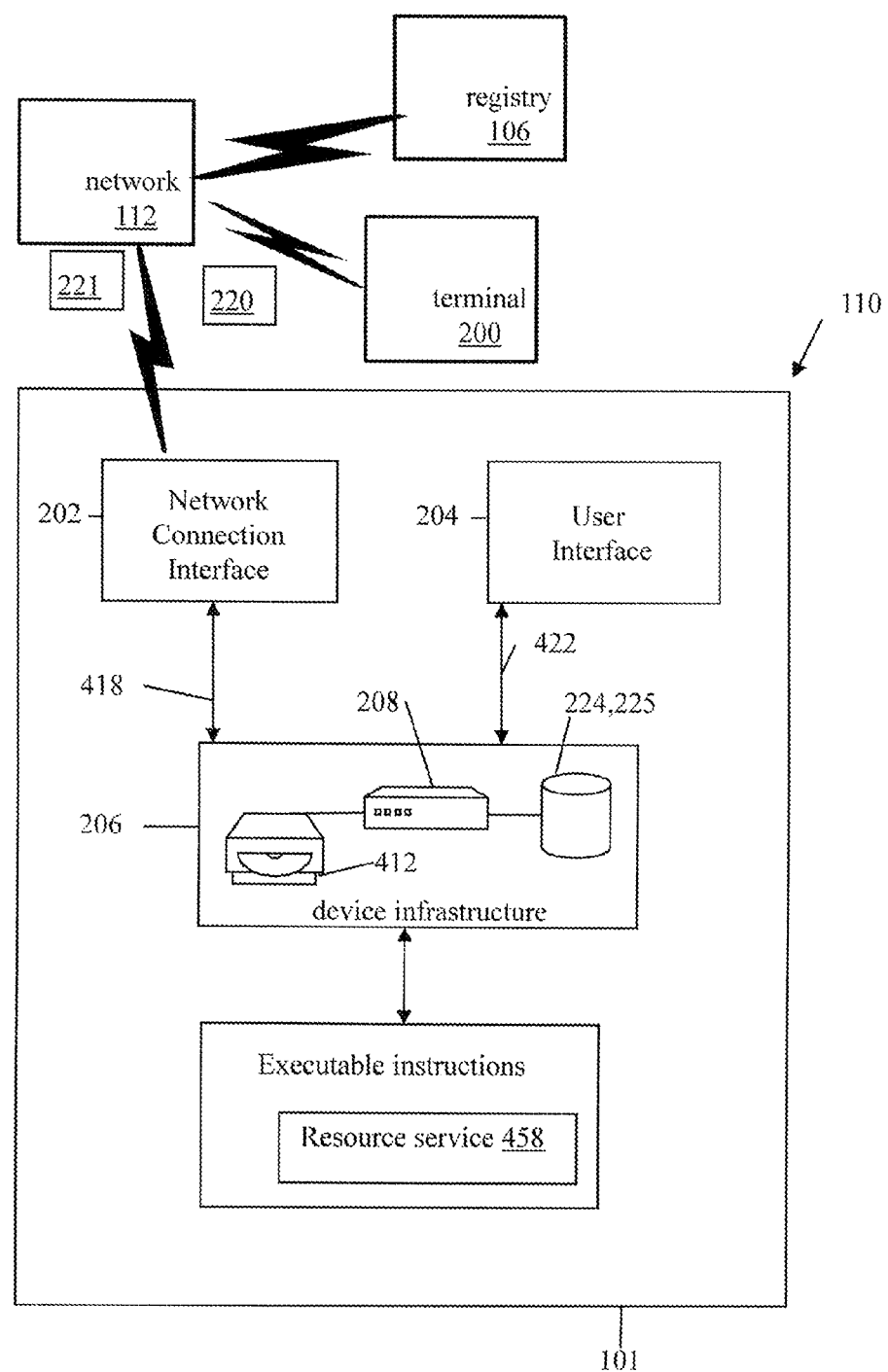
FIG. 8 an example configuration of network service of the system of FIGS. 1 and 5a,b.

As such, the authorization server 110 (and/or the client application 390) implements an analytical method via a resource access service 458 (see FIG. 8) for determining an appropriate network resource 104 selection, selected as a particular network resource 104 ranked over other network resources 104) to satisfy the access request 220 (e.g. including resource parameters 456), based on reviewing/comparing the available network resources 104 of the user profile 450 and/or appropriate network resources 104 contained in the general resource records 300. It is recognised that most of the network resources 104 contained in the resource records 300 can represent those network resources 104 that are not specifically listed in the user profile 450 and thus can represent network resources 104 unused (e.g. thus far) by the user of the network terminal 200. In terms of the rankings 454 assigned (e.g. dynamically, statically) to the resource IDs 452 of the network resources 104 used by the network terminal 200, and thus listed in the user profile 450, it is understood that a weighting scheme can be used by the authorization server 110 (and/or the client application 390) to determine what is the most appropriate network resource 104 to match the current access request 220 received from the resource application 390 of the network terminal 200.

Resource Registry 106

The resource registry 106 (e.g. a database or data store) can be used to store pertinent information about each of the network resources 104, including resource records 300 including: a user access field 306 containing access information used to authenticate and/or make available the network resource 104 to a particular user via their network terminal 200; a resource type field 304 containing resource features/capabilities information (e.g. laser, inkjet, colour, black and white, collation, paper quality, paper size, etc.); and a physical location information field 309 that can contain geographic location information 309a (e.g. latitude and longitude), and can contain metadata 309b concerning a description of the physical location of the network resource 104 such as but not limited to the location within a building (e.g. particular room location within a multi-room building), directions within the building that the network resource 104 is located (e.g. go to second floor and turn left from the main elevator and second office/store on your right), street address of the building that the network resource 104 is located in, a sequence of directions to follow in order once the building is entered by the user (e.g. turn left, turn right, walk 20 meters straight ahead, etc.) and/or a building map showing an internal layout of the building and indicating the location of the network resource 104 on the layout. As such, the resource records 300 can be used to match against any resource parameters 456 that are part of the access request 220 and/or part of the user profile 450 when the resource service 458 of the authorization server 110 (or the client application 390) determines the appropriate network resource 104 to suggest in order to satisfy the access request 220.

It is recognised that the resource records 300 can contain the actual information (e.g. user access data, resource type data, physical location data) as discussed above, can contain link(s) or other electronic reference(s) to the actual information that is stored in another record of the registry 106 and or other storage (e.g. database, table, list, etc.) located locally and/or remotely from the resource registry 106, or a combination thereof. For example, the network resource registry 106 can contain the geographic location 309a (can be also a parameter 456 considered in the determination) and a link (e.g. URL) to the actual metadata 309b that is provided by a Website and/or Web service (facilitated by a building server 116 that can be the same or different from the polling server 116 and/or the enterprise server 118) that is associated with, and/or maintained by, the building that houses/owns the network resource 104. In the case of the metadata 309b being supplied by the building server 116,118 a directions information request 250 (see FIG. 5b) can be provided by the network terminal 200 directly and/or by the authorization server 110 to the building server 116,118, in order for the network terminal 200 to receive a directions response 251 containing the directions metadata/information 309b for use in guiding the user of the network terminal 200 once they arrive at the building (housing the network resource 104) as specified by the physical location information/data 309a. In this manner, the building (housing the network resource 104) can control the content of, and degree of access to, the metadata/information 309b. For example, access to the metadata/information 309b can be controlled by the building server 116,118 based on the real time geographic location (e.g. supplied by the GPS information of the network terminal 200 itself) of the user as the approach to and navigate within the building, for example including the ability of the user to retain a copy of the metadata/information 309b (or portions thereof) on the network terminal 200 once the user has arrived at the network resource 104. As such, it is recognised that a number of factors/parameter 456 can affect the definition of the user state, which can impact the determination of which suggested network resource 104 is chosen from the user profile 450 and/or the resource records 300.

Figure 3:
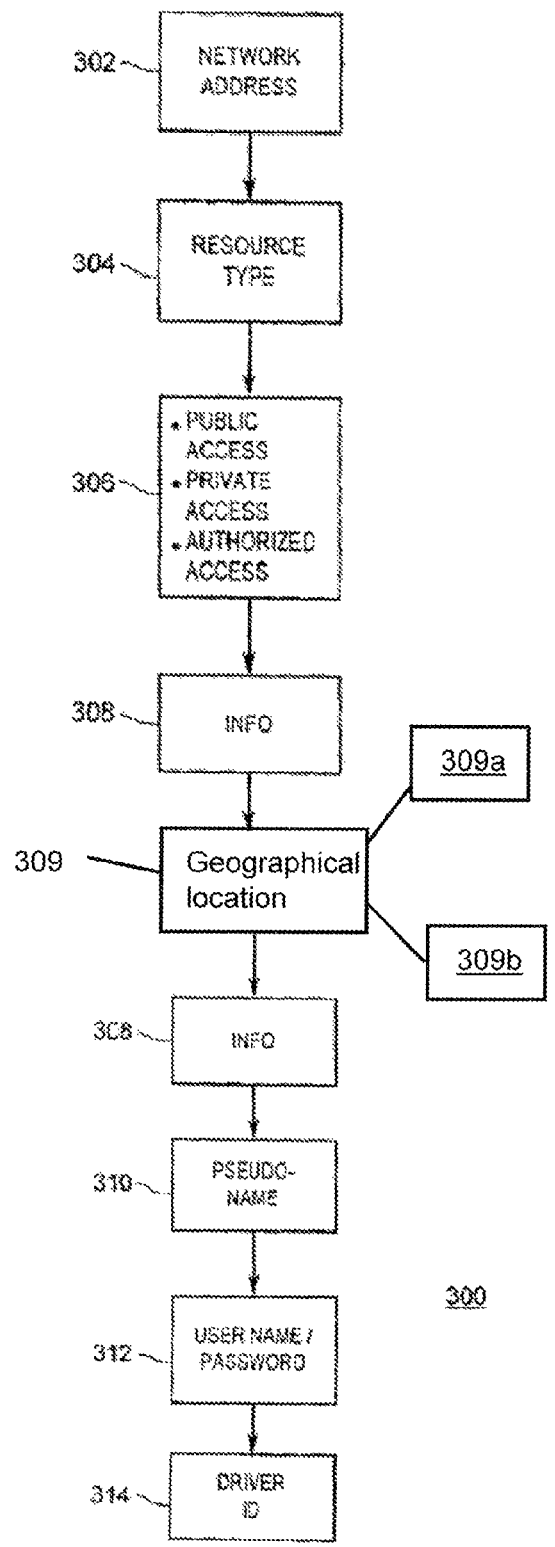
FIG. 3 is a schematic view of the format of the resource records comprising the resource database of the resource registry depicted in FIG. 1, showing the network address field, the resource type field, the user access level field, the resource information field, the pseudo-name field, the username/password field, and the driver identification field.

Further to the above, the resource registry 106 comprises a resource database 120, a driverdatabase 222, and a user registration database 124. The resource database 120 includes the resource records 300 identifying parameters associated with the network resources 104. As shown in FIG. 3, each resource record 300 can comprise the network address field 302, the resource type field 304, and the user access level field 306 for the associated network resource 104. The network address field 302 identifies the network address of the network resource 104. Each network resource 104 can comprises an IPP-compliant printer, in which case the network address field 302 identifies comprises the network resource IPP address. However, in the case where the network resource 104 comprises a non-IPP-compliant device and the communications network 112 comprises the Internet, preferably the network resource 104 is linked to the communications network 112 via a suitable server, and the network address field 302 for the network resource 104 identifies the Internet Protocol ("IP") address of the server.

The resource type field 304 identifies the type of data communication device of the network resource 104. For instance, the resource type field 304 may specify that the network resource 104 is a printer, an image server, a file server, an e-mail pager, or an e-mail enabled wireless telephone. Further, the resource type field 304 may include a resource type sub-field specifying a sub-class of the network resource type. For example, the resource type sub-field may specify that the network resource 104 is an IPP-capable printer, or a non-IPP-capable printer.

The user access level field 306 identifies the type of communications access which the network terminals 200 are allowed to have in regards to the associated network resource 104. In the embodiment, as presently envisaged, the user access level field 306 establishes that the network resource 104 allows one of: (a) "public access" in which any network terminal 200 of the network resource access system 100 can communicate with the network resource 104; (b) "private access" in which only members (e.g. employees) of the enterprise associated with the network resource 104 can communicate with the network resource 104; and (c) "authorized access" in which only particular network terminals 200 can communicate with the network resource 104.

If the user access level field 306 specifies "authorized access" for a network resource 104, preferably the user access level field 306 includes a sub-field which lists the names of the network terminals 200 authorized to access the network resource 104, and a sub-field which includes an authorization password which the identified network terminals 200 must provide in order to access the network resource 104. If the user access level field 306 specifies "private access" for a network resource 104, preferably the user access level field 306 includes a sub-field which lists the network address of the network terminals 200 which are deemed to members of the enterprise.

It should be understood, however, that the user access level field 306 is not limited to identifying only the foregoing predefined user access levels, but may instead identify more than one of the predefined user access levels, or other user access levels altogether. For instance, the user access level field 306 may identify that the associated network resource 104 allows both private access to all employees of the enterprise running the network resource 104, and authorized access to other pre-identified network terminals 200. Further, the user access level field 306 may also include one or more sub-fields (not shown) which provide additional restrictions/permissions on the type of communications access which the network terminals 200 are allowed to have in regards to the associated network resource 104. For instance, the user access level sub-fields may limit the hours of operation of the network resource 104, or may place restrictions on the type of access limitations on a per-user basis, or per-group basis. Other variations on the type of access will be readily apparent, and are intended to be encompassed by the scope of the present invention.

Preferably, each resource record 300 includes an information field 308, 309 which provides information on the network resource 104, such as data handling capabilities, resource pricing and/or geographical co-ordinates. This latter parameter is particularly advantageous for use with mobile network terminals 200, such as a wireless-enabled personal data assistant or an e-mail-enabled wireless telephone, since it allows the network terminal 200 to identify the nearest one of a plurality of available network resources 104.

It is recognised that the information field 309, containing (and/or associated with) the physical location information 309a, is the record 300 used by the authorization server 110 to match the one or more respective network resources 104 that are available/accessible (e.g. nearest) to the user of the network terminal 200, based on geographical location information 119 (see FIG. 5b) of the user that is supplied with the access electronic communications 220 to the system 100. It is recognised that the geographical location information 119 can be supplied by the user and/or network terminal 200 (i.e. manually an/or automatically) as GPS information indicative of the real time location of the network terminal 200 (e.g. a PDA), as street address or other physical location (e.g. intersection, postal/zip code, etc.), or in other forms (e.g. triangulation information) as is known in the art. For example, the user provides in their communication 220 their user ID, their geographical location 119, and optionally any features/capabilities desired of the network resource 104. The authorization server 110 is configured to receive the network resource access request communication 220 and to match one or more network resources 104 using at least the geographical location 119 compared to the geographical information 309a. The response of the system 100 (e.g. via the authorization server 11O) to the network terminal 200 can include a list of one or more network resources 104 (e.g. provided as a results list including the respective locations 309a of each of the network resources 104 in the results list, and optionally and features/capabilities of the network resource 104 deemed pertinent to the network resource access request communication 220).

Each resource record 300 can also include a pseudo-name field 310, a username/password field 312 and a network driver identifier field 314. The pseudo-name field 310 contains a resource pseudo-name which identifies the network resource 104 to the network terminals 200. Preferably, the pseudo-name is a network alias that identifies the physical location and properties of the network resource 104, but does not identify the network address of the resource 104. Further, preferably each pseudo-name uniquely identifies one of the network resources 104, however a group of the network resources 104 may be defined with a common pseudo-name to allow communication with a group of network resources 104. This latter feature is particularly advantageous since it allows the administrator of an enterprise associated with the group of network resources to dynamically allocate each network resource 104 of the group as the demands for the network resources 104 or maintenance schedules require.

In addition, preferably the resource record 300 includes a plurality of the pseudo-name fields 310 to allow the administrator of the associated network resource 104 to update the name assigned to the network resource 104, while also retaining one or more previous pseudo-names assigned to the network resource 104. As will be explained, this feature is advantageous since it allows the administrator to update a resource name without the risk that network terminals 200 using a prior pseudo-name will be unable to locate or communicate with the network resource 104.

The username/password field 312 contains a unique username and password combination which allows the administrator of the associated network resource 104 to prevent authorized access and alteration to the data contained in the resource record 300. Preferably, each resource record 300 also includes an e-mail address field (not shown) which the network resource access system 100 uses to provide the administrator of the associated network resource 104 with a notification e-mail message when a message is successfully transmitted to the network resource 104.

The driver identifier field 314 contains a resource driver identifier which is used in conjunction with the driver database 122 to provide the network terminals 200 with the appropriate resource driver for communication with the network resource 104. The driver database 122 includes resource drivers which allow software applications installed on the network terminals 200 to communicate with the network resources 104. As will be explained below, in order for a network terminal 200 to communicate with a selected network resource 104, the network terminal 200 first downloads a driver application data from the administration server 108 over the communications network 112. The network terminal 200 may also download the appropriate resource driver from the driver database 122 (via the authorization server 110 over the communications network 112), and then allow the authorization server 110 to configure the downloaded resource driver in accordance with the access level field 306 of the resource record 300 associated with the selected network resource 104. Preferably, each resource driver includes a resource driver identifier which allows the authorization server 11O to identify the resource driver which the network terminal 200 has downloaded. It is also recognised that the driver database 122 can contain generic drivers to permit appropriate consumption/processing of the application data 221 by the receiving network resource 104.

The resource registry 106 can also contain user profiles 450 (see FIG. 3) for each user that is registered with the system 100 (e.g. with the authorization server 110). The user profile 450 can have a number of data fields including references 402 (e.g. network resource ID 402 such as an alias name, printer ID, etc.) for the network resources 104 that have been utilized by the user of the network terminal 200 in the past. For example, the user profile 450 for each of the users could contain a list of network resource IDs 452 (e.g. printers) that the user has used in the past, such that each of the network resource IDs 452 also has a ranking 454 that defines which are the network resources 104 is more preferred by the user. The ranking 454 of a particular network resource ID as higher (e.g. more preferred or suitable for user needs) as compared to lower (e.g. less preferred or suitable for user needs) in the network resource list of the user profile 450 can be dependent upon one or more factors 456 such as but not limited to: geographic location of the network terminal 200 obtained via GPS or other network terminal 200 location information; geographic location of the network resource 104 obtained via GPS or other network resource 104 location information (e.g. from the registry data 300); number of times the user has submitted network resource data (e.g. print data) to the network resource 104; network assignment of the network terminal 104, for example the network terminal is connected to a home Wifi network 112 as compared to a workplace network 112 (e.g. Wifi) or generally only the Internet 112; whether authentication is required by the user or not for network resource 104 access; most recently used network resource 104; most recently used network resource 104 matching resource requirements (e.g. resource parameters 456) of the access request 220; as well as any other user behaviour data that can be used to determine a preference for the user of one network resource 104 as compared to a different network resource 104.

It is recognised that the ranking 404 for each of the network resources 104 with respect to one another can be determined statically by the resource service 458 in advance of receiving the resource request 220, such that any resource parameters 456 contained in the access request 220 do/does not affect/change the rankings 404 used by the resource service 458 (or the client application 390) to determine the suggested network resource 104 (e.g. selected resource ID based on the rankings 454). Alternatively, the ranking 454 for each of the network resources 104 with respect to one another can be determined dynamically by the resource service 458 (or the client application 390) after receiving the resource request 220, such that any resource parameters 456 contained in the access request 220 do/does affect/change the rankings 454 used by the resource service 458 (or the client application 390) to determine the suggested network resource 104 (e.g. selected resource ID based on the rankings 454), e.g. the resource parameters 456 of the access request 220 are used in combination with resource parameters 456 stored in the user profile 450 to dynamically calculate weighted rankings 454 of the network resources 104 (via the resource IDs 452) stored in the user profile 450. Alternatively, the ranking 454 for each of the network resources 104 with respect to one another can be determined dynamically by the resource service 458 (or the client application 390) after receiving the resource request 220, such that any resource parameters 456 contained in the access request 220 do/does affect/change the rankings 454 used by the resource service 458 (or the client application 390) to determine the suggested network resource 104 (e.g. selected resource ID based on the rankings 454), e.g. the resource parameters 456 of the access request 220 are used in substitution of resource parameters 456 stored in the user profile 450 to dynamically calculate weighted rankings 454 of the network resources 104 (via the resource IDs 452) stored in the user profile 450. Alternatively, the ranking 454 for each of the network resources 104 with respect to one another can be determined dynamically by the resource service 458 (or the client application 390) after receiving the resource request 220, such that any resource parameters 456 contained in the access request 220 do/does not affect/change the rankings 454 used by the resource service 458 (or the client application 390) to determine the suggested network resource 104 (e.g. selected resource ID based on the rankings 454), e.g. the resource parameters 456 of the access request 220 are not used and instead the resource parameters 456 stored in the user profile 450 are used to dynamically calculate weighted rankings 454 of the network resources 104 (via the resource IDs 452) stored in the user profile 450.

Once the suggested network resource 104 is selected by the resource service 458, the corresponding network resource ID 452 is submitted to the network terminal 200 via the access response 220 (along with any further optional network resource 104 information) over the communications network 112. Preferably the user of the network terminal 200 is registered with the authorization sever 110 and thus has their user profile 450 (containing ranked network resource IDs 452) stored in the resource registry 106 and available to the resource service 458 (or the client application 390) in communication with the network client application 390 provisioned on the network terminal 200.

Resource Client Application 390

Figure 6:
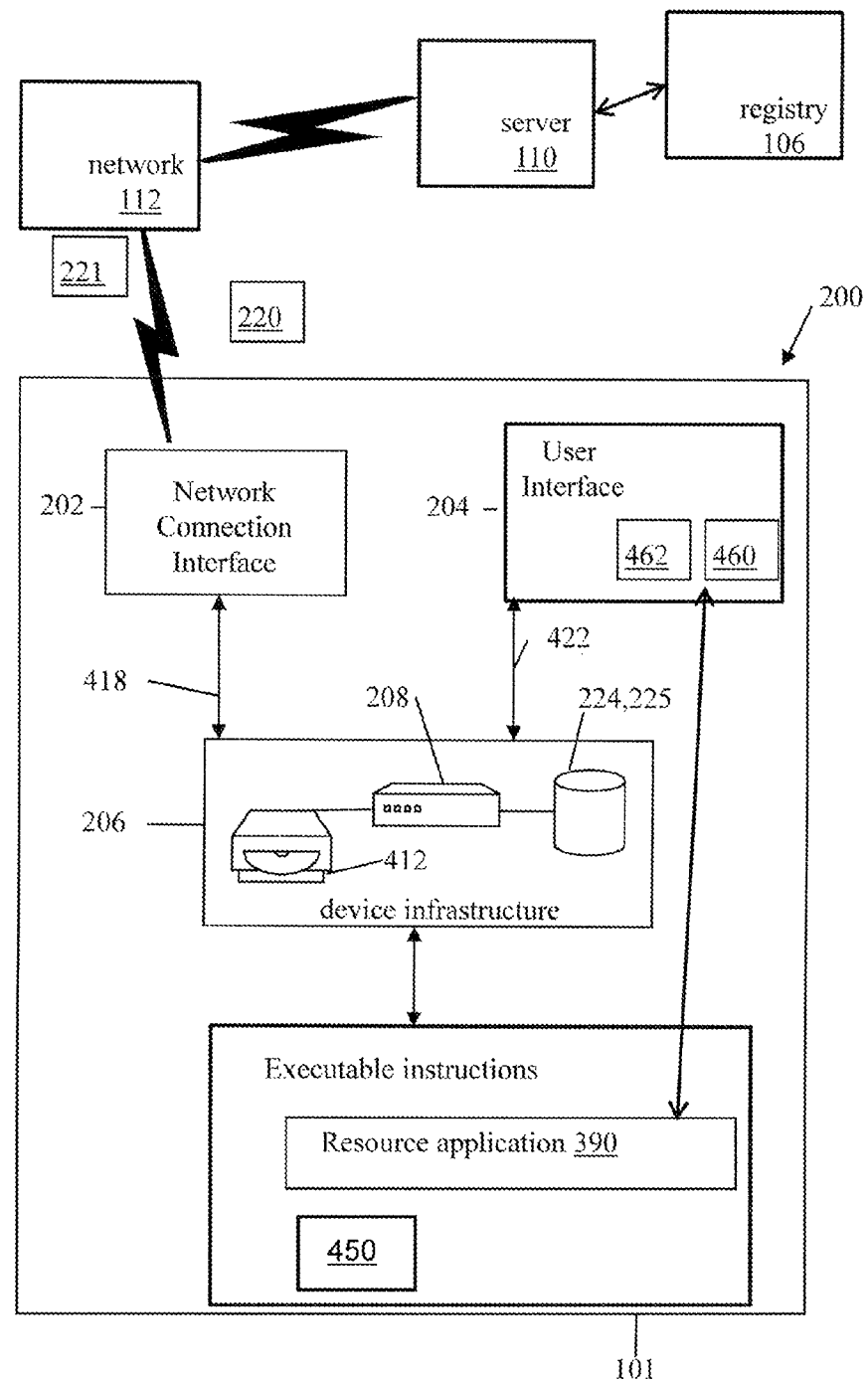
FIG. 6 an example configuration of network terminals of the system of FIGS. 1 and 5a,b.

Referring to FIG. 6, the resource client application 390 is installed on the network terminal 200 and is configured to communicate over the communications network 112 with the resource service 458. The application 390 receives a request by the user (e.g. via the user interface 204) and/or by an application running on the device infrastructure 206 for submitting application data 221 (e.g. a document) to a network resource 104 (e.g. a printer) available via the resource service 458. For example, the resource service 458 can receive the application data 221 (e.g. as part of the access request 220 or follow up communication to the access request 220) from the network terminal 220 and then forward the application data 221 to the network resource 104 selected by the network terminal 200 for processing (e.g. printing). Alternatively, the resource service 458 can provide the network 112 address of the network resource 104 in the resource response 220 and then the network terminal 200 could submit the application data 221 directly to the network resource 104 in a network 112 path that bypasses the resource service 458, as desired, using the network interface 202.

The client application 390 provides (e.g. displays) on the user interface 204 a resource access (e.g. virtual button, menu selection, etc.) option 460 used to submit selected application data 221 to the network resource 104 associated with the access option 460. It is recognised that the application data 221 could be stored in storage associated with the device framework 206 or could be stored off-device (e.g. via another network 112 connected device not shown).

For example, the user could launch the resource client 390 on the network terminal 200 via the user interface 204 (e.g. select application 390 icon) and the resource application 390 could ask the user to select or otherwise indicate the application data 221 desired for processing by a network resource 104. Otherwise, the user could access application data 221 on the network terminal 200 via a framework application associated with the application data 221 (e.g. a spreadsheet document being manipulated by the user via a spreadsheet application hosted on the network terminal 200) and once data processing (e.g. printing) is selected by the user within the framework application, the framework application could launch (either directly, or indirectly via the operating system) the resource client application 390 noting the selected application data 221.

Once the application data 221 is selected, the executing client application 390 could send an access request 220 to the resource service 458 along with any resource parameters 456 applicable to the application data 221. The resource service 458 would evaluate the user profile 450 contents along with any appropriate resource parameters 456 (form the access request 220 and/or stored from the user profile 450) to determine the best network resource 104 (e.g. highest ranked network resource 104 satisfying the access request 220 for the selected application data 221). As noted above, the ranking of the network resources 104 within the user profile 450 could be done dynamically (e.g. on an access request 220 by access request 220 basis) and/or statically (e.g. rankings established for use before receipt of the access request 220).

Once the resource client application receives the access response 220 from the resource service 458, the client application 390 would present on the user interface 204 a confirmation option 462 indicating the highest ranked network resource ID 452 suggested, chosen from the user profile 450 by the resource service 458 in consultation with the resource registry 106. The user could select the confirmation option 462 in the positive, e.g. accept or agree with the network resource 104 suggestion, and then the application data 221 would be sent to the suggested network resource 104 over the communications network 112 for subsequent processing. Upon selection of the suggestion for network resource 104 by the user, the client application 390 could send this suggestion selection to the resource service 458 for use in updating the rankings 454 in the user profile 450 of the accepted network resource 104, as further described below.

Alternatively, the user could select the confirmation option 462 in the negative, e.g. reject or disagree with the network resource 104 suggestion. In this example, the network service 458 could provide the client application 390 with alternative network resource 104 suggestions for presentation on the user interface 204. Upon selection of an alternative suggestion for network resource 104 by the user, the client application 390 could send this alternative suggestion selection to the resource service 458 for use in updating the rankings 454 in the user profile 450 of the accepted network resource 104 selected and also for use in updating the rankings 454 in the user profile 450 of the other network resource 104 rejected, as further described below.

Alternatively, the client application 390 could present on the user interface 204 an indication that the highest ranked network resource 104 is currently unavailable (e.g. offline, etc.) and instead suggest an alternative network resource 104 suggestion as obtained from the resource service 458 (e.g. also chosen as the second highest ranked network resource 104 from the user profile 450, or as chosen. As per above, the user has the option of selecting the confirmation option 462 in either the positive or negative. Upon selection of an alternative suggestion for network resource 104 by the user, the client application 390 could send this alternative suggestion selection to the resource service 458 for use in updating the rankings 454 in the user profile 450 of the network resource 104, as further described below. In the case where the highest ranked network resource 104 that was currently unavailable (e.g. offline, etc.) is only temporarily unavailable, the client application 390 and/or the resource service 458 may not update the ranking of the alternatively suggested network resource 104 after use, as clearly the user does not prefer to use this alternative network resource unless the original (i.e. best match) network resource 104 is unavailable. In the case where the highest ranked network resource 104 that was currently unavailable (e.g. offline, etc.) is permanently unavailable or otherwise unavailable for an extended period of time, the client application 390 and/or the resource service 458 could update the ranking 456 of the alternatively suggested network resource 104 after use, as clearly the user will prefer to use this alternative network resource 104 in the future as the original (i.e. best match) network resource 104 is now unavailable. One example is where the alternatively suggested network resource 104 assumes the ranking 456 of the previous highest ranked network resource 104 that is now currently unavailable.

As such, it is recognised that the client application 390 can provide for bandwidth usage and/or power savings for the network terminal 200, as the system 100 leverages use of the resource service 458 and associated resource registry 106 to seek and find suitable (e.g. best or highest ranked 454 based on access request 220) network resource(s) 104 on behalf of the network terminal 200, rather than having the network terminal 200 actively scan the network 112 to discover for available and suitable network resources 104 for selected application data 221. It is also recognised that the user profile 450 (or portions thereof) could also be stored locally on in storage of the device framework 206 and thus the user profile 450 contents could be interrogated by the source service 458 in determination of the highest ranked network resource 104, based on resource parameters 456 and/or alternative network resources 104 in the resource records 300.

Alternatively, the use of the resource registry records 300,450 by the client application 390 provides an advantage to the user of the network terminal 200 of being able to suggest the most relevant network resource 104 that matches the access request 220 and also user behaviour defined by the resource parameters 456 stored in the user profile 450, rather than have the network terminal 200 itself scan/discover the network 112 for available network resources 104. Further, the use of the user profile 450 provides for the client application 390 to suggest matching network resources 104 (o the access request 220) based on resource parameters 456 and rankings 454 contained in the user profile 450. For example, when the user decides to submit application data 221 to an available/suitable network resource 104, the client application 390 would suggest different "best matching" network resources 104 for different resource parameter 456 fact scenarios, based on the situation (e.g. particular network segment connection such as work verses home verses roaming scenario, type of application data 221 such as colour verses black and white print data, last used network resource 104, etc.)

Figure 5A:
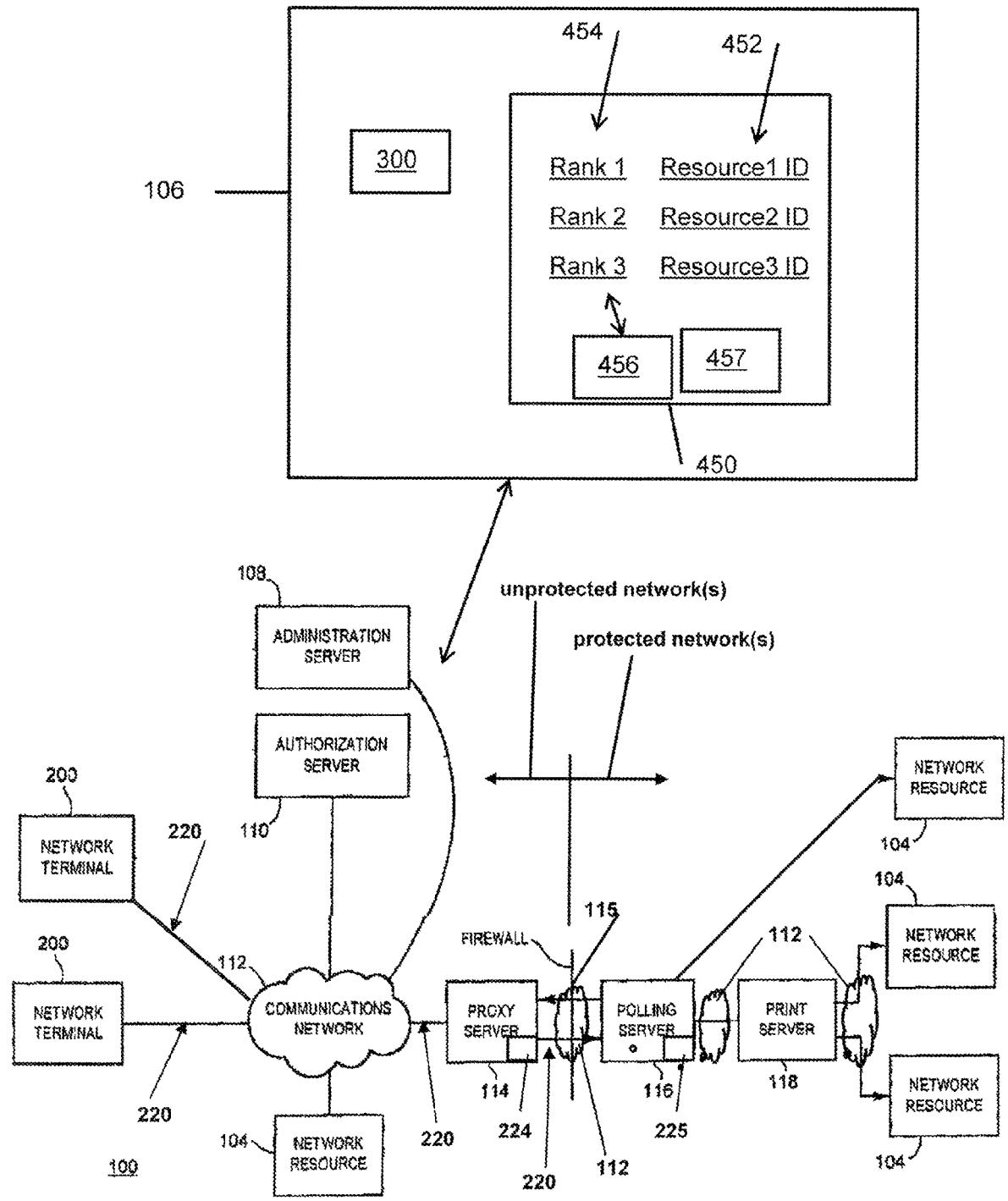
FIG. 5a shows a further embodiment of the network system of FIG. 1.
Figure 5B:
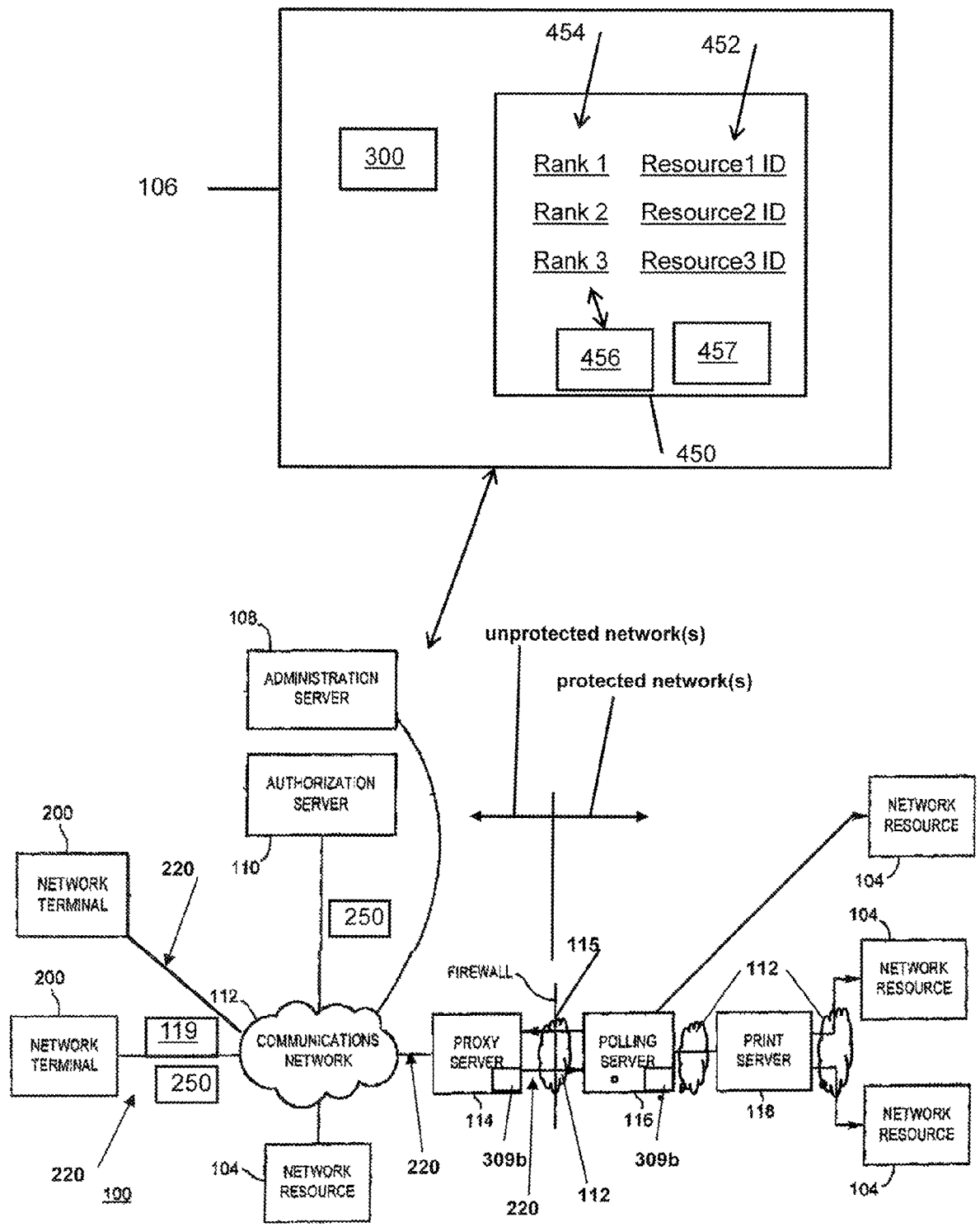
FIG. 5b shows a further embodiment of the network system of FIG. 1.

The network terminal 200 can use the client application 390 to determine the most appropriate rankings 454 of all the potential resource IDs 452 that match the resource request 220, based on a weighted ranking calculation using the resource parameters 456 stored in the user profile 450 and/or contained in the access request 450 itself (see FIG. 5*a,b*). For example, if the access request 450 is for a printer 104 to process print data 221 for black and white (B&W) printing, the client application 390 determines that B&W would be one process parameter 456 to consider in determining a weighted ranking of all resource IDs 452 (of printers 104) stored in the user profile 450. The client application 390 would also consider other resource parameter(s) 456 stored in the user profile 450, such as frequency of network resource 104 usage, last network resource 104 used, etc, to come up with the best matched (e.g. highest ranked) printer 104 for the access request 220. For example, if two printers 104 in the user profile 40 match B&W printers and are potentially of equal ranking 454, the client application 390 could add increased weighting to the ranking 454 in view of the resource parameter 456 of last B&W printer 104 used or increased weighting to the ranking 454 in view of the parameter 456 of most frequent B&W printer 104 used in order to come up with the highest ranked printer 104.

The ranking 454 of the various resource IDs 452 of the user profile 450 is implemented by the client application 390 in order to match the "best" available network resource 104 to the access request 220 of the network terminal 200, based on resource parameters 456 supplied in the access request 220 (e.g. application data 221 type, user location 119, network 112 segment, etc.) and/or contained in the user profile 450 (e.g. last network resource 104 used, most frequent used, availability status, resource location 309, authorization needed as per public vs. private access, etc.). The ranking 454 determination can be implemented by the client application 390 in order to choose between several network resource 104 options as listed in the user profile 450. As such, the client application 390 can have many criteria (resource parameters 456) to consider, as no particular network resource 104 option may be perfect for a given resource access request 220. Weighted ranking 454 can be a method implemented by the client application 390 to help decide between network resource 104 options of the user profile 450 when there may be no obvious winner unless resource parameters 456 are prioritized (e.g. weighted) for a particular access request 220, in order to determine the highest ranked network resource 104. Each network resource 104 options of the user profile 450 can be judged by the client application 390 using a number of criteria (resource parameters 456); each criterion (resource parameter 456) can be assigned a weight, or degree of importance.

An overall score for each network resource 104 option of the user profile 450 is calculated by the client application 390, and then the best (e.g. highest ranked network resource 104) option(s) are displayed/presented to the user via the user interface 204. In the event of a refusal or rejection of a suggested network resource 104 by the user, then an alternative suggestion can be selected as the suggested network resource 104 in descending order of their overall score, as a replacement for the previously rejected network resource 104 submitted for display in the user interface 104 of the network terminal 200.

As such, the client application 390 has a table of weights 457 for each type of resource parameter 456, to be used in calculating the highest ranking 454 network resource 104 for the access request 220. For example, weighted ranking can be implemented by the client application 390 based on differential weighting 457 assigned to the criteria 456 (or categories), and the relative weight 457 of each criterion 456, used to rank the network resources 104 of the user profile 450. The weighted scoring method, also known as 'weighting and scoring', is a form of multi-attribute 456 or multi-criterion 456 analysis. It can involve identification of all the parameters 456 that are relevant to the project (e.g. a black and white printer type 456 may not be used for a colour access request); the allocation of weights 457 to each of the parameters 456 to reflect their relative importance; and the allocation of scores to each network resource 104 option/suggestion to reflect how each network resource 104 performs in relation to each attribute 456. The resulting calculation is a single weighted score 454 for each network resource 104 suggestion, which can be used to indicate and compare the overall performance of the network resource 104 to satisfy the access request 220. It is recognised that the table of weights 457 can exist, only meaning that the table of weights 457 could be something generated every time based on the current environment, i.e. user state used with the comparison of the user profile 450 and other parameters 456 to determine the suggested network resource 104.

An example of ranking 454 determination by the client application 390 is as follows. The client application 390 can assign assigns numeric values to individual resource IDs 452 based on various resource parameters 456 considered. For example, wanted is to suggest a network resource 104 (e.g. printer) based on the resource parameters 456 of most frequent usage and network 112 segment to which the network terminal is connected, for example the network terminal 200 is connected to network 1 (preferred primary) and network 2 (preferred secondary) but not to network 3. We have three network resources 104 which have been used the following days in the most recent time period (e.g. month, day, week, etc.): resource 1 used 10 times; resource 2 used 15 times; resource 3 used 20 times. Further, resource 1 is available on network 1, resource 2 is available on networks 1 and 2 and resource 3 is available only on network 3 only. Weighting 457: 50% for frequency and 50% for available on network 1 segment as a 2 value (representing primary designation) and available on network 2 as a 1 value (representing secondary designation) provides resource 1 score as 0.5(10)+0.5(2)=6.0, resource 2 score as 0.5(15)+0.5(1)=8.0, and resource 3 score as 0.0 as it is discounted entirely over and above the weighting calculation as not available on the network segment of the network terminal 200. Therefore, resource 2 gets ranked 454 as the highest and therefore suggested (via resource response 220) as the network resource 104 to satisfy the user's resource access request 220, even though it is not on the designated primary network. This examples shows how frequency of use can be used to drive a suggested network resource dynamically based on user behaviour. If the user accepts the resource 2 suggestion, then the client application 390 would update the usage frequency, from 15 times to 16 times, as notified by the client application 390 upon selection of resource option 460,461 from the user interface 204.

Communications Network 112

The network resource access system 100 uses the communications network 112 to facilitate communication between the network terminals 200 (hosting the resource client application 390), the network resources 104, the administration server 108, and the authorization server 110 (hosting the resource service 458). Preferably, the communications network 112 can be a wide area network such as the Internet, however the network 112 may also comprise one or more local area networks 112. Further, the network 112 need not be a land-based network, but instead may comprise a wireless network and/or a hybrid of a land-based network and a wireless network for enhanced communications flexibility. One example is where the communications network 112 includes a local area network 112 segment (e.g. wired, wireless, etc. on which the network terminal is registered, communicates on) and a wide area network 112 segment (e.g. the Internet on which the resource service 458 is addressed) to which the local area network 112 is connected to.

In this manner, the network terminal 200 can access the network resources 104 on the local area network 112 segment based on an access request 220 (and response containing the suggested network resource 104 on the local area network 112) received by the resource service 458 accessible on the wide area network 112 segment. Alternatively, the network terminal 200 can access network resources 104 on the local area network 112 segment, however, accesses network resources 104 on the wide area network 112 segment, based on an access request 220 (and response containing the suggested network resource 104 on the wide area network 112) received by the resource service 458 also accessible on the wide area network 112 segment. Alternatively, the network terminal 200 can be coupled to the wide area network 112 segment, however, subsequently access network resources 104 on the local area network 112 segment, based on an access request 220 (and response containing the suggested network resource 104 on the local area network 112) received by the resource service 458 also accessible on the wide area network 112 segment.

Alternatively, the network terminal 200 can access the network resources 104 on the local area network 112 segment based on an access request 220 (and response containing the suggested network resource 104 on the local area network 112) received by the resource service 458 accessible on the local area network 112 segment. Alternatively, the network terminal 200 can access network resources 104 on the local area network 112 segment, however, access network resources 104 on the wide area network 112 segment, based on an access request 220 (and response containing the suggested network resource 104 on the wide area network 112) received by the resource service 458 accessible on the local area network 112 segment. Alternatively, the network terminal 200 can be coupled to the wide area network 112 segment, however, subsequently access network resources 104 on the local area network 112 segment, based on an access request 220 (and response containing the suggested network resource 104 on the local area network 112) received by the resource service 458 accessible on the local area network 112 segment. In these examples where the resource service 458 is available on the local network 112 segment, it is recognised that the resource registry 106 can be addressed on the local area network 112 segment in communication with the resource service 458 also on the local area network 112 segment and/or the resource registry 106 can be addressed on the wide area network 112 segment in communication with the resource service 458 on the local area network 112 segment, as desired.

Network Terminal 200

Each network terminal 200 typically comprises a land-based network-enabled personal computer. However, the invention is not limited for use with personal computers. For instance, one or more of the network terminals 200 may comprise a wireless communications device, such as a wireless-enabled personal data assistant, a tablet, or e-mail-enabled mobile telephone if the network 112 is configured to facilitate wireless data communication. In addition, the invention is not limited to only facilitating transmission of text data 221 as the application data 221 (see FIG. 6) as part of or subsequent to the access request 220, but can be used to transmit image data, audio data or multimedia data 221 in addition or substitution of the text data 221, as desired. The network terminal 200 is capable of supplying geographical location information 119 of itself to the system 100 in the access communication 220 to request access to one or more network resources 104. It is recognised that the network resources 104 optionally can be specified by name (e.g. pseudo name, resource ID 452, etc.) in the access communication 220, along with the included geographical location information 119 as one of the resource parameters 456. It is recognised that the geographical location information 119 can specify a specific location (e.g. a point position on a map) or a collection of locations such as a region (e.g. a street having multiple buildings and therefore potential network resources, a neighbourhood/city or other geographical area such as a region having defined street boundaries and/or distance/radius from a specified map location), etc. As such, the resource service 458 determines the best ranked 454 network resource 104 for the network terminal 200 based on the contents of the user profile 450 stored in the resource registry 106.

In addition, the user may provide the administration server 108 (or authorization server 110) with the geographical coordinates 119 (see FIG. 5b) of the user to determine the user's best ranked (e.g. nearest suitable for the selected application data 221) network resources 104. The user may provide its geographical coordinates through any suitable mechanism known to those skilled in the art, including latitude/longitude co-ordinates, GPS, and wireless triangulation. Other methods of obtaining geographical coordinates may also includes Wi-Fi based services, such as those offered by Skyhook Wireless.

Further, the location information 119 can be in the form of geographical coordinate data, such as, for example, Global Positioning System ("GPS") coordinate data specifying latitude, longitude and elevation. In some embodiments, the location information 119 may comprise the GPS satellite network and the location information via a GPS transceiver for obtaining GPS coordinate data. Other IP address-based location information or services may also be used to provide additional location data that may be used to confirm or verify location information from other services or sources. The location information 119 may also be obtained based on wireless site survey data obtained through a wireless network interface card on the network terminal 200. Wireless site survey data typically includes MAC addresses of other nearby network interface cards, SSID-type information that identifies nearby wireless base stations, and the signal power associated with each. The wireless site survey data may then be submitted to a location service that can then return GPS-type coordinate data. An example of a location service based on this type of wireless data is offered by Skyhook Wireless. If network terminal 200 includes a cellular modem for use with a mobile telephone network, location information 119 may be obtained by using multiple cell towers to perform multilateration, trilateration or triangulation. Location information 119 may also be provide by a hybrid approach using any combination of GPS, IP address-based service, wireless data and cell tower location techniques. It is recognised that location information 119 is only one of the resource parameters 456 that can be used to determine rankings 454 by the resource service 458, in order to determine and select the highest ranked 454 network resource 104 associated with the user profile 450.

Figure 2:
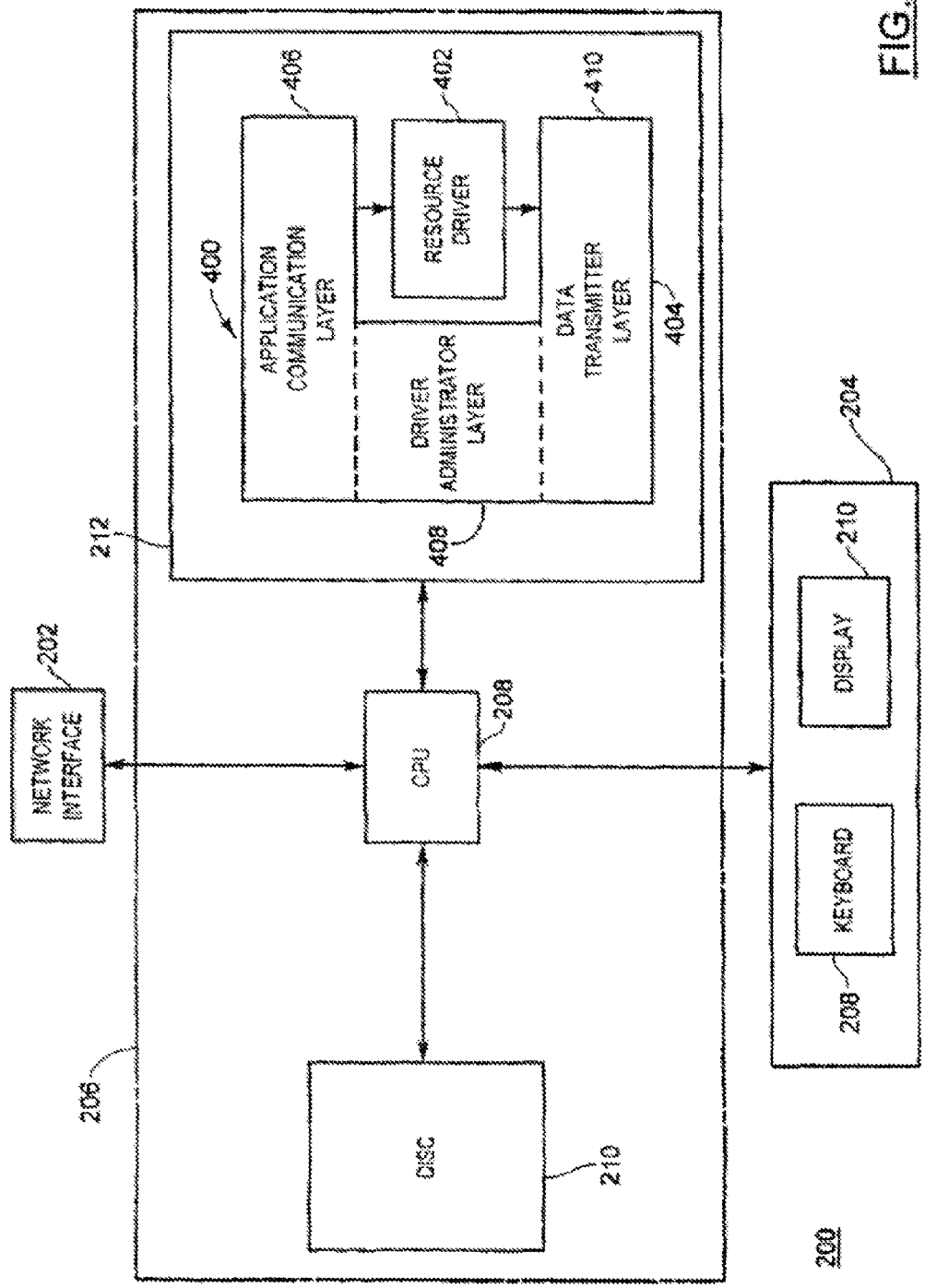
FIG. 2 is a schematic view one of the network terminals depicted in FIG. 1, showing the driver application for use with the present invention.

As shown in FIG. 2, the network terminal 200 comprises a network interface 202, a user interface 204, and a data processing system 206 in communication with the network interface 202 and the user interface 204. Typically, the network interface 202 comprises an Ethernet network circuit card, however the network interface 202 may also comprise an RF antenna for wireless communication over the communications network 112. Preferably, the user interface 204 comprises a data entry device 208 (such as keyboard, microphone or writing tablet), and a display device 210 (such as a CRT or LCD display).

The data processing system 206 includes a central processing unit (CPU) 208, and a non-volatile memory storage device (DISC) 210 (such as a magnetic disc memory or electronic memory) and a read/write memory (RAM) 212 both in communication with the CPU 208. The DISC 210 includes data which, when loaded into the RAM 212, comprise processor instructions for the CPU 208 which define memory objects for allowing the network terminal 200 to communicate with the network resources 104 and the authorization server 110 over the communications network 112. The network terminal 200, and the processor instructions for the CPU 208 will be discussed in greater detail below.

Network Resource 104

Typically, each network resource 104 can comprise a printing device, and in particular, an IPP-compliant printer. However, the invention is not limited for use with networked printers (IPP-compliant or otherwise), but instead can be used to provide access to any of a variety of data communication devices 104, including facsimile machines, image servers and file servers. Further, the invention is not limited for use with land-based data communications devices, but instead can be used to provide access to wireless communications devices. For instance, the network resource access system 100 can be configured to facilitate data communication with e-mail pagers or e-mail enabled wireless telephones 200.

It is expected that some of the network resources 104 may be located behind an enterprise firewall 115 (see FIG. 5a). Accordingly, to facilitate communication between network terminals 200 and firewall-protected network resources 104, the network resource access system 100 may also include a proxy server 114 located logically outside the enterprise firewall 115, and a polling server 116 located logically within the firewall 115, as shown in FIG. 1. Preferably, the proxy server 114 is located on-site at the enterprise responsible for administering the network resource 104, is provided with a network address corresponding to the enterprise, and includes a queue or other memory storage device 224 (see FIG. 5a) for receiving application data 221. However, the proxy server 114 may also be located off-site, and may be integrated with the authorization server 110 if desired. This latter option can be advantageous since it allows system administrators to provide access to network resources 104, but without having to incur the expense of the domain name registration and server infrastructure.

In addition to the proxy server 114 and the polling server 116, the enterprise can include an enterprise/resource server 118 (e.g. a print server) to facilitate communication with the network resources 104 located behind the firewall 115 and the polling server 116. The polling server 116 is in communication with the enterprise server 118, and is configured to initiate periodic polling messages to the proxy server 114 through the firewall 115 to determine whether application data 221 from or otherwise associated with a network terminal 200 is waiting in the memory 224 of the proxy server 114. The proxy server 114 is configured to transmit any stored/queued application data 221 to the polling server 116 in response to the poll signal from the polling server 116. Upon receipt of the stored application data 221 from the proxy server 114, the polling server 116 can transmit the application data 221 to the enterprise server 118 for distribution to the appropriate network resource 104, for example. As will be apparent, this poll mechanism allows application data 221 to be transmitted to network resources 104 located behind a firewall 115, but without exposing the enterprise to the significant possibility of security breaches associated with firewall 115 access ports that are always open. In other words, the firewall 115 access ports are opened based on when the polling operations are to occur and then are preferably closed again until the next polling operation occurs. The polling communications are examples of the network communications 220.

It is recognised that the polling mechanism can be used to provide the location information 309b via the polling server 116 to the proxy server 114 for subsequent communication 220 to the network terminal 200. In this manner, the polling mechanism can be used to limit access by the network terminal 200 to computer devices (e.g. servers 116,118) and data located behind the firewall 115. For example, the poll signal can be used to determine if there is any request 220 for location information 309b stored in the queue of the proxy server 114 and poll signal can be used to provide the requested location information 309b by the polling server through the firewall 115 to the proxy server 114, for subsequent transmission to the network terminal 200, via the communications network 112, that is external to the firewall 115. In this manner, access to the location information 309b (by the network terminal 200 and/or the servers 108,110) can be controlled by the building computer services (i.e. those computers and resources located behind the firewall 115) that are associated with the requested network resource 104 (i.e. accessible by the user of the network terminal 200). It is also recognised that the network terminal 200 has a driver configured for facilitating data communication between the network resource 104 and the network terminal 200, once the network terminal 200 has been provided access to the network resource 104 by the system 100. As such, the location information 309b can also be resident in the resource registry records 300,450 and therefore be communicated to the network terminal 200 by the resource service 458, for example in response communication 220. Also, the location information 309b can be used as a resource parameter 456 used by the resource service 458 in determining respective rankings 454 of the various network resource IDs 452 in the user profile 450.

Resource Service 458

The use of the resource registry records 300,450 by the authorization server 110 provides an advantage to the user of the network terminal 200 of being able to suggest the most relevant network resource 104 that matches the access request 220 and also user behaviour defined by the resource parameters 456 stored in the user profile 450, rather than have the network terminal 200 itself scan/discover the network 112 for available network resources 104. Further, the use of the user profile 450 provides for the resource service 458 to suggest matching network resources 104 (o the access request 220) based on resource parameters 456 and rankings 454 contained in the user profile 450. For example, when the user decides to submit application data 221 to an available/suitable network resource 104, the client application 390 would suggest different "best matching" network resources 104 for different resource parameter 456 fact scenarios, based on the situation (e.g. particular network segment connection such as work verses home verses roaming scenario, type of application data 221 such as colour verses black and white print data, last used network resource 104, etc.)

The authorization server 110 uses the resource service 458 (see FIG. 8) to determine the most appropriate rankings 454 of all the potential resource IDs 452 that match the resource request 220, based on a weighted ranking calculation using the resource parameters 456 stored in the user profile 450 and/or contained in the access request 450 itself (see FIG. 5a,b). For example, if the access request 450 is for a printer 104 to process print data 221 for black and white (B&W) printing, the resource service 458 determines that B&W would be one process parameter 456 to consider in determining a weighted ranking of all resource IDs 452 (of printers 104) stored in the user profile 450. The resource service 456 would also consider other resource parameter(s) 456 stored in the user profile 450, such as frequency of network resource 104 usage, last network resource 104 used, etc, to come up with the best matched (e.g. highest ranked) printer 104 for the access request 220. For example, if two printers 104 in the user profile 40 match B&W printers and are potentially of equal ranking 454, the resource service 458 could add increased weighting to the ranking 454 in view of the resource parameter 456 of last B&W printer 104 used or increased weighting to the ranking 454 in view of the parameter 456 of most frequent B&W printer 104 used in order to come up with the highest ranked printer 104.

The ranking 454 of the various resource IDs 452 of the user profile 450 is implemented by the resource service 458 in order to match the "best" available network resource 104 to the access request 220 of the network terminal 200, based on resource parameters 456 supplied in the access request 220 (e.g. application data 221 type, user location 119, network 112 segment, etc.) and/or contained in the user profile 450 (e.g. last network resource 104 used, most frequent used, availability status, resource location 309, authorization needed as per public vs. private access, etc.). the ranking 454 determination can be implemented by the resource service 458 in order to choose between several network resource 104 options as listed in the user profile 450. As such, the resource service can have many criteria (resource parameters 456) to consider, as no particular network resource 104 option may be perfect for a given resource access request 220. Weighted ranking 454 can be a method implemented by the resource service 458 to help decide between network resource 104 options of the user profile 450 when there may be no obvious winner unless resource parameters 456 are prioritized (e.g. weighted) for a particular access request 220, in order to determine the highest ranked network resource 104. Each network resource 104 options of the user profile 450 can be judged by the resource service 458 using a number of criteria (resource parameters 456); each criterion (resource parameter 456) can be assigned a weight, or degree of importance.

An overall score for each network resource 104 option of the user profile 450 is calculated by the resource service 458, and then the best (e.g. highest ranked network resource 104) option(s) are displayed/presented to the user via the user interface 204. In the event of a refusal or rejection of a suggested network resource 104 by the user, as communicated to the resource service 458 via the client application 390, then an alternative suggestion can be selected as the suggested network resource 104 in descending order of their overall score, as a replacement for the previously rejected network resource 104 submitted for display in the user interface 04 of the network terminal 200.

As such, the resource service has a table of weights 457 for each type of resource parameter 456, to be used in calculating the highest ranking 454 network resource 104 for the access request 220. For example, weighted ranking can be implemented by the resource service 458 based on differential weighting 457 assigned to the criteria 456 (or categories), and the relative weight 457 of each criterion 456, used to rank the network resources 104 of the user profile 450. The weighted scoring method, also known as 'weighting and scoring', is a form of multi-attribute 456 or multi-criterion 456 analysis. It can involve identification of all the parameters 456 that are relevant to the project (e.g. a black and white printer type 456 may not be used for a colour access request); the allocation of weights 457 to each of the parameters 456 to reflect their relative importance; and the allocation of scores to each network resource 104 option/suggestion to reflect how each network resource 104 performs in relation to each attribute 456. The resulting calculation is a single weighted score 454 for each network resource 104 suggestion, which can be used to indicate and compare the overall performance of the network resource 104 to satisfy the access request 220. It is recognised that the table of weights 457 can exist, only meaning that the table of weights 457 could be something generated every time based on the current environment, i.e. user state used with the comparison of the user profile 450 and other parameters 456 to determine the suggested network resource 104.

An example of ranking 454 determination by the resource service 458 is as follows. The resource service 458 can assign assigns numeric values to individual resource IDs 452 based on various resource parameters 456 considered. For example, wanted is to suggest a network resource 104 (e.g. printer) based on the resource parameters 456 of most frequent usage and network 112 segment to which the network terminal is connected, for example the network terminal 200 is connected to network 1 (preferred primary) and network 2 (preferred secondary) but not to network 3. We have three network resources 104 which have been used the following days in the most recent time period (e.g. month, day, week, etc.): resource 1 used 10 times; resource 2 used 15 times; resource 3 used 20 times. Further, resource 1 is available on network 1, resource 2 is available on networks 1 and 2 and resource 3 is available only on network 3 only. Weighting 457: 50% for frequency and 50% for available on network 1 segment as a 2 value (representing primary designation) and available on network 2 as a 1 value (representing secondary designation) provides resource 1 score as 0.5(10)+0.5(2)=6.0, resource 2 score as 0.5(15)+ 0.5(1)=8.0, and resource 3 score as 0.0 as it is discounted entirely over and above the weighting calculation as not available on the network segment of the network terminal 200. Therefore, resource 2 gets ranked 454 as the highest and therefore suggested (via resource response 220) as the network resource 104 to satisfy the user's resource access request 220, even though it is not on the designated primary network. This examples shows how frequency of use can be used to drive a suggested network resource dynamically based on user behaviour. If the user accepts the resource 2 suggestion, then the resource service 458 would update the usage frequency, from 15 times to 16 times, as notified by the client application 390 upon selection of resource option 460,461 from the user interface 204.

Resource Driver 400 Configuration

The following is an example of optional driver configuration of the network terminal 200 used to configure the application data 221 for subsequent consumption/processing by the target network resource 104. It is also recognised that the network terminals 200 and the corresponding network resources 104 could be preconfigured with a generic driver to provide for preconfigured transmission and consumption/processing of the application data 221.

The example dynamically configurable driver application will now be discussed in association with FIG. 2. As discussed above, the DISC 210 of the network terminal 200 includes data which, when loaded into the RAM 212 of the network terminal 200, comprise processor instructions for the CPU 208. As shown, the downloaded driver application data defines in the RAM 212 a memory object comprising a driver application 400. The driver application 400 includes a generic resource driver 402 and a wrap-around resource driver layer 404. The generic resource driver 402 allows the network terminal 200 to communicate with a variety of different network resources 104, however the generic resource driver 402 typically will not provide the network terminal 200 with access to all the features and capabilities of any particular network resource 104. If the network terminal 200 requires additional features not implemented with the generic resource driver 402, the appropriate resource driver may be downloaded from the driver database 116, as mentioned above.

The wrap-around driver layer 404 includes an application communication layer 406, a driver administrator layer 408, and a data transmitter layer 410. The application communication layer 406 is in communication with the resource driver 402 (generic or network resource specific) and the application software installed on the network terminal 200, and is configured to transmit user application data between the application software and the resource driver 402. The driver administrator layer 408 communicates with the resource registry 106 over the communications network 112 to ensure that the driver application 400 is properly configured for communication with the selected network resource 104. The data transmitter layer 410 is in communication with the resource driver 402 and is configured to transmit the data output from the resource driver 402 over the communications network 112 to the selected network resource 104, via the network interface 202, as accepted by the user from the suggested options 460,462 provided by the resource service 458.

Although the driver application 400 and its constituent component layers are preferably implemented as memory objects or a memory module in the RAM 212, it will be apparent that the driver application 400 may instead be implemented in electronic hardware, if desired. Returning to FIG. 1, the registration database 124 of the resource registry 106 includes user records each uniquely associated with a user of a respective network terminal 200 upon registration with the network resource access system 100. Each user record identifies the name the registered user's name, post office address and e-mail address. In addition, each user record specifies a unique password which the registered user specifies in order to update the user's user record, and to obtain access to network resources 104 configured for "authorized access". The user record may also include additional information specifying default options for the network resource access system 100. For instance, the user may specify that the network resource access system 100 should provide the user with an acknowledgement e-mail message when a message is successfully transmitted to a selected network resource 104. The user may also specify an archive period for which the network resource access system 100 should archive the message transmitted to the selected network resource 104. This latter option is advantageous since it allows the user to easily transmit the same message to multiple network resources 104 at different times, and to periodically review transmission dates and times for each archive message.

Server 108,110 Operation

The administration server 108 is in communication with the resource database 120 and the registration database 124. The administration server 108 provides administrators of the network resources 104 with access to the records of the resource database 120 to allow the administrators/and or users of the network terminals 200 to update the user profile 450 contents (e.g. to input additional resource IDs 452, suggested rankings, suggested resource parameters 456, suggested weighting factors 457, etc.) The administration server 108 provides administrators of the network resources 104 with access to the records of the resource database 120 to allow the administrators/and or users of the network terminals 200 to update the network address field 302, the resource type field 304, the user access level field 306, the resource information field 308, the pseudo-name field 310, the username/password field 312 and/or the driver identifier field 314 of the resource record 300 for the associated network resource 104. As will become apparent, this mechanism allows network administrators to change, for example, the network address and/or the restrictions/permissions of the network resources 104 under their control, or even the network resource 104 itself, without having to notify each network terminal 200 of the change. The administration server 108 also provides controlled access to the registration database 124 so that only the user of the network terminal 200 which established the user record can update the user record.

Where the username/password field 312 has been completed, the administration server 108 is configured to block access to the resource record 300 until the administrator provides the administration server 108 with the correct username/password key. This feature allows the resource administrator to make adjustments, for example, to pricing and page limit, in response to demand for the network resources 104, and to make adjustments to the restrictions/permissions set out in the user access level field 306 and the resource information field 308 and thereby thwart unauthorized access to the network resources 104. Further, updates to the geographical information 309 are also performed via the administration server 108, in order to keep up-to-date the data 309a,b associated with each network resource 104, as can be utilized as one of the resource parameters 456 by the resource service 458. For example, the resource service 458 can use the resource registry records 300 to populate resource parameters 456 for resource IDs 452 listed in the user profile 450 by the user, as desired. Alternatively, the resource service 458 can interrogate/access the resource registry 106 records 300 for suitable resource parameters 456 for each of the listed resource Dis of in the user profile 450 when the rankings 454 are calculated by the resource service 458 (e.g. statically or dynamically).

The authorization server 110 can be in communication with the resource database 120 and the driver database 122 for providing the network terminals 200 with the resource drivers 402 appropriate for the selected network resources 104. Preferably, the authorization server 110 is also configured to configure the driver application 400 for communication with the selected/suggested network resource 104, by transmitting the network address of the selected network resource 110 to the data transmitter layer 410 over a communications channel secure from the user of the network terminal 200 so that the network address of the network resource 104 is concealed from the user of the network terminal 200. In the case where the communications network 112 comprises the Internet, preferably the secure communications channel is established using the Secure Sockets Layer ("SSL") protocol.

It is also recognised that the authorization server 110 can be used to provide the network terminal 200 with a list of available network resources 104 that are accessible by the user of the network terminal 200 and also are appropriate for consumption/processing of the particular application data 221 as desired by the network terminal 200 user (e.g. specific network resources 104 may provide certain desired processing features while others may not). As discussed above, these suggested network resources 104 are based on matches in view of determined/calculated highest rankings 454 by the resource service 458. Examples of specific processing or consumption features of the network resources 104 that can be used as resource parameters 456 by the resource service 458 can include features such as but not limited to: colour, print quality, print resolution, viewing resolution, processing cost, location of the resource 104, etc. It is recognised that the list of network resources 104 can be based on matching of the geographical location information 119 of the network terminal 200 with the geographical information 309 of the network resource 104. Example matching can include an exact match of the information 119,309, an inexact match of the information 119,309 (e.g. location 119 of each network resource 104 is within a predetermined and/or specified distance, radius of location 309), or a combination thereof, as is deemed relevant in view of the weights 457 applied to the ranking 454 calculation performed by the resource service 458.

In addition to the network terminal 200, the network resource 104, the resource registry 106, the administration server 108, the authorization server 110, and the communications network 112, the network resource access system 100 can also include optionally a transaction server 126 and an archive server 128a. The transaction server 126 is in communication with the authorization server 11O for keeping track of each data transfer between a network terminal 200 and a network resource 104. For each transmission, preferably the transaction server 126 maintains a transmission record identifying the network terminal 200 which originated the transmission, the network resource 104 which received the transmission, and the date, time and byte size of the transmission.

The archive server 128a is configured to retain copies of the data transmitted, for a specified period. As discussed above, the user of a network terminal 200 specifies the requisite archive period (if any) for the data transmission, upon registration with the network resource access system 100. Preferably, the administration server 108 provides controlled access to the transaction server 126 and the archive server 128a so that only the user of the network terminal 200 which originated transmission of the data is allowed access to the transmission record associated with the transmission.

Example Interaction Between the Network Terminal 200 and the System 100

Figure 4A:
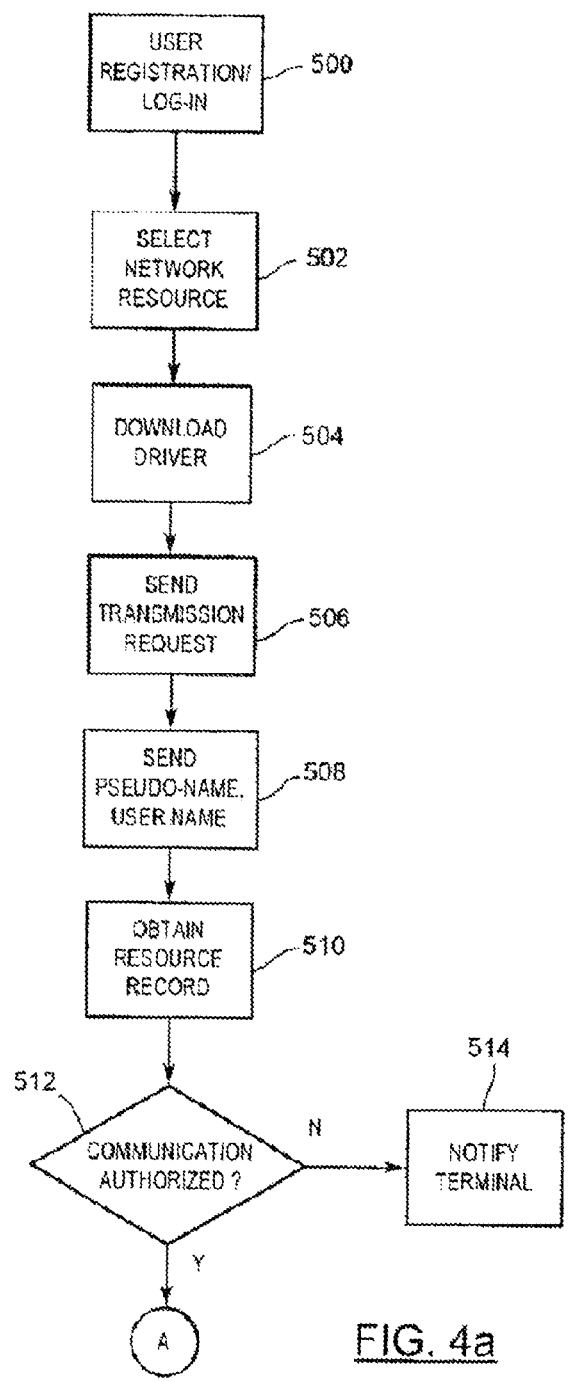
FIGS. 4a,b are flow charts depicting the method of operation of the network resource access system.
Figure 4B:
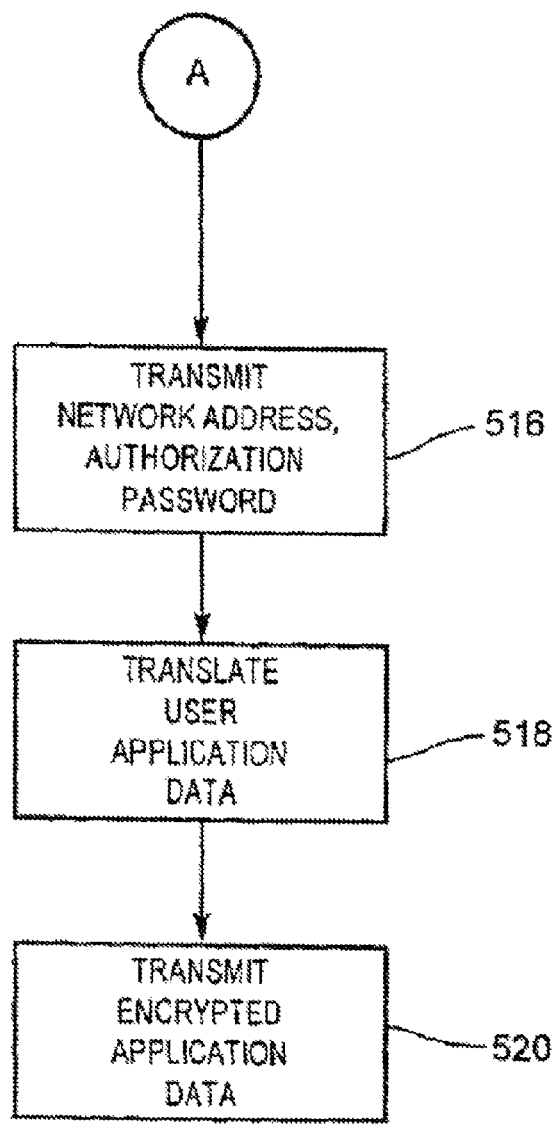

The process by which a user of a network terminal 200 can communicate with a network resource 104 (as selected by the options 460,462 provided by the resource service 458) is now described by example with reference to FIG. 4a,b. The following discussion presupposes that the user of the network terminal 200 has downloaded or otherwise has a suitable driver application 400 (e.g. from the administration server 108 over the communications network 112). At step 500, the user of a network terminal 200 decides whether to log in to the network resource access system 100. As discussed above, if the user registers with the network resource access system 100 and subsequently logs in to the network resource access system 100 (by providing the authorization server 106 with the user's assigned password), the user will have access to any network resources 104 which have "authorized access" as the user access level and which have identified the registered user as a user authorized to access the network resource 104. If the user does not register or fails to log in to the network resource access system 100, the user will only have access to network resources 104 which have established "public access" as the user access level. It is recognised that the authorized/public access can be used as a resource parameter 456 by the resource service 458.

At step 502, the user selects (via options 460,462) a network resource 104 by querying 220 the service 458 for a network resource 104 to submit the application data 221 to. Alternately, the user may postpone selection of a network resource 104 until initiation of the transmission command. The network user query may be based upon any desired criteria 456, including print turn-around time and page size (where the target network resource 104 is a printer), price, and geography (e.g. desired degree of match between location information 119,309), network segment, etc. For example, the user may provide the service 458 with the geographical coordinates 119 of the user to determine the user's nearest (i.e. desired degree of match between location information 119,309) network resources 104 as one of the resource parameters 456. The user can provide its geographical coordinates 119 through any suitable mechanism known to those skilled in the art, including latitude/longitude co-ordinates, GPS, and wireless triangulation.

If the user requested an available network resource 104, the user is provided with a suggestion of pseudo-name(s) (e.g. resource IDs 452) associated with each network resource 104 satisfying the designated search criteria 456. As discussed above, if the user logged in to the network resource access system 100, the pseudo-name suggestion can include both "public access" network resources 104 and "authorized access" network resources 104 with which the user has been authorized to communicate. Also, if the user is member of an enterprise having network resources 104 registered with the network resource access system 100, the pseudo-name suggestion can also identify network resource(s) 104 which have been registered by the enterprise for "private access". Otherwise, the pseudo-name suggestion can only identify network resource(s) 104 registered for public access. Upon receipt of the resource list, the user selects a network resource 104 from the option 460,462.

At step 504, the administration server 108 can query the network user's network terminal 200 for the resource driver identifier of the resource driver 402 configured on the network terminal 200, and then compares the retrieved resource driver identifier against the resource driver identifier specified in the network driver identifier field 314 of the resource record 300 associated with the selected network resource 104 to determine whether the driver application 400 has been configured with the appropriate resource driver 402 for communication with the network resource 104. If the network terminal 200 has not been configured with the appropriate resource driver 402, the administration server 108 prompts the user's network terminal 200 to download the necessary resource driver 402. As will be apparent, the downloaded resource driver 402 becomes part of the driver application 400.

When the user of the network terminal 200 is ready to communicate with the selected network resource 104, the user of the network terminal 200 transmits a transmission request via its application software to the driver application 400, at step 506. If the user did not select (e.g. confirm suggestion via options 460,462) a network resource 104 at step 502, the application communication layer 406 of the driver application 400 can contact the service 458 over the communications network 112 and prompts the user to select a network resource 104, as described above. Once a network resource 104 is selected, and the appropriate resource driver 402 is installed, the application communication layer 406 notifies the driver administrator layer 408 of the transmission request.

At step 508, the driver administrator layer 408 can provide the authorization server 110 with the transmission request and identifies the selected network resource 104, by transmitting to the authorization server 11O the pseudo-name assigned to the selected network resource 104. If the user of the network terminal 200 has registered and logged in to the network resource access system 100, the driver administrator layer 408 also provides the authorization server 110 with the registered user's name.

The authorization server 110 then queries the resource database 120 with the received pseudo-name for the resource record 300 associated with the pseudo-name, at step 510. The authorization server 110 then extracts the user access level from the user access level field 306 of the retrieved resource record 300, and determines whether the network terminal 200 is authorized to communicate with the selected network resource 104, at step 512. As will be apparent from the foregoing discussion, if the user access level field 306 specifies "public access" for the network resource 104, the network terminal 200 will be automatically authorized to communicate with the network resource 104.

However, if the user access level field 306 specifies "private access" for the network resource 104, the authorization server 110 determines the network address of the network terminal 200 from the transmission request transmitted by the network terminal 200, and then queries the user access level sub-field with the terminal's network address to determine whether the network terminal 200 is authorized to communicate with the network resource 104. In the case where the communications network 112 comprises the Internet, the authorization server 110 can determine the network terminal's network address from the IP packets received from the network terminal 200. On the other hand, if the user access level field 306 specifies "authorized access" for the network resource 104, the authorization server 110 can query the user access level sub-field with the user's name to determine whether the network terminal 200 is authorized to communicate with the network resource 104.

If the query at step 512 reveals that the network terminal 200 is not authorized to communicate with the network resource 104, at step 514 the authorization server 110 provides the network terminal 200 with a notification that the network terminal 200 is not authorized for communication with the selected resource 104. However, if the query at step 512 reveals that the network terminal 200 is authorized to communicate with the network resource 104, the authorization server 110 queries the network address field 302 of the resource record 300 associated with the network resource 104 for the network address of the network resource 104. The authorization server 110 then establishes a secure communications channel with the driver administrator layer 408, and then transmits the network address to the driver administrator layer 408 over the secure communications channel, at step 516.

Also, if the user access level field 306 specifies "authorized access" for the network resource 104, and the network terminal 200 is authorized to communicate with the network resource 104, the authorization server 110 queries the user access level sub-field for the authorization password assigned to the network resource 104, and then transmits the authorization password to the driver administrator layer 408 over the secure communications channel, together with the network address. In the case where the communications network 112 comprises the Internet, preferably the authorization server 110 establishes the secure communications channel using a Secure Sockets Layer ("SSL") protocol. Since the network address and the authorization password are transmitted over a secure communications channel, this information is concealed from the user of the network terminal 200. It is recognised that the checking of authorized access for a particular network resource 104 can be performed by the resource service 458 in advance of the determination of the rankings 454 prior to selection of the suggested network resource 104 submitted to the client application 390 for presentation in options 460,462 via the network terminal 200 user interface 204.

Preferably, the authorization server 110 can also extract the resource driver identifier from the resource identifier field 314 of the resource record 300, and determines whether the network terminal 200 is still properly configured for communication with the network resource 14. If the network terminal 200 no longer has the correct resource driver 402, the authorization server 110 queries the driver database 122 for the correct resource driver 402, and prompts the user of the network terminal 200 to download the correct resource driver 402. This driver configuration verification step may be performed concurrently or consecutively with the network address providing step described in the preceding paragraph.

In addition, the server 110 queries the registration database 124 to determine whether the user of the network terminal 200 registered with the network resource access system 100. If the user registered with the network resource access system 100 and specified that the archive server 128a should maintain archival copies of data transmissions, the server 110 transmits the network address of the archive server 128a to the driver administrator layer 408. As a result, when the user of the network terminal 200 issues a data transmission command, the driver application 400 will transmit the user application data to the selected network resource 104 and to the archive server 128a.

At step 518, the application communication layer 406 passes the application data received from the application software to the resource driver 402 for translation into a format suitable for processing by the selected network resource 104. Meanwhile, the driver administrator layer 408 interrogates the network resource 104, using the received network address, to determine whether the network resource 104 still resides at the specified network address, is operational and is on-line.

If the interrogated network resource 104 resides at the specified network address, is operational and is on-line. online, the resource driver 202 passes the translated application data to the data transmitter layer 410 of the driver application 400. Preferably, the data transmitter layer 410 compresses and encrypts the translated application data upon receipt. The data transmitter layer 410 also receives the network address of the network resource 104 from the driver administrator layer 408, adds the network address data to the compressed, encrypted data, and then transmits the resulting data over the communications network 112 to the network resource 104 at the specified network address, at step 520.

Preferably, the data transmitter layer 410 also transmits details of the transmission to the transaction server 126, such as the selected network resource 104 and the byte size of the transmission. Upon receipt of the transmission details, preferably the administration server 108 queries the resource database 120 and the user registration database 124 for the e-mail address of the resource administrator and the e-mail address of the user of the network terminal 200, if provided, and then transmits an email message indicating completion of the transmission.

If the user access level field 306 specifies "authorized access" for the network resource 104, the data transmitter layer 410 also receives the authorization password for the network resource 104 from the driver administrator layer 408, and transmits the authorization password (as part of the compressed, encrypted data) to the network resource 104.

If the user access level field 306 specifies "public access" for the network resource 104, preferably the network resource 104 is accessible through a local server which serves to queue, decrypt and decompress the application data, and extract the network address data, and then transmit the decompressed application data to the appropriate network resource 104. Alternately, the network resource 104 itself may be configured for direct communication over the communications network 112, such as an IPP-capable printer, so that the network resource 104 is able to process the application data directly.

If the user access level field 306 specifies "authorized access" for the network resource 104, preferably the network resource 104 is accessible through a local server which serves to queue, decrypt and decompress the application data, and extract the network address data and authorization password, and then transmit the application data to the appropriate network resource 104 if the received authorization password is valid.

If the user access level field 306 specifies "private access" for the network resource 104, typically the network resource 104 will be located behind a firewall. Accordingly, the proxy server 114 associated with the network resource 104 will receive the application data, and transfer the application data to the proxy server queue. The polling server 116 associated with the network resource 104 will poll the proxy server 114 to determine the status of the queue. Upon receipt of a polling signal from the polling server 116, the proxy server 114 transmits any queued application data from the proxy server queue, through the firewall, to the polling server 116. The polling server 116 then extracts the network address from the received application data, and transmits the application data to the appropriate server 118 or network resource 104 for processing. Also, the polling signals can be used to provide the geographical information 309b to the network terminal 200 via the communications network 112, e.g. directly by the proxy server 114 and/or indirectly from the server 116,118 through the server 108,110 (and also through the proxy server 114 in the case where the polling mechanism is used to securely transmit the geographical information 309b through the firewall 115).

It is also recognised that the network terminal 200 and/or the server 108,110 can communicate with the servers 116, 118 using network communications 220 in a more traditional fashion, such that communication is initiated between the network terminal 200 or the server 108,110 from outside of the firewall 115 using firewall access ports that remain open for any synchronous or asynchronous communications 220 being initiated and received from computing devices (e.g. devices 200, 108,110) located on a communications network 112 located external to the firewall 115 (i.e. located on a communications network 112 having a lower level of trust that the level of trust of the network(s) located behind/internal to the firewall 115). In this manner, the signals would originate from outside of the firewall 115 and be directed through open access ports towards the server 116, 118 (not shown).

As will be apparent from the foregoing discussion, regardless of the user class defined for a network resource 104, if a resource administrator relocates a network resource 104 to another network address, and/or changes the device type and/or restrictions/permissions associated with the network resource 104, the resource administrator need only update the resource record 300,400 associated with the network resource 104 to continue communication with the network resource 104. Subsequently, when a user attempts communication with the network resource 104 using the original pseudo-name, the authorization server 110 will provide the administrator layer 408 with the updated network address of the network resource 104, or prompt the user to download the appropriate resource driver 402, assuming that the network terminal 200 is still authorized to communicate with the network resource 104.

Further, if the user access level field 306 specifies "authorized access" for the network resource 104 and the resource administrator desires to change the pseudo-name and authorization password associated with the network resource 104, the resource administrator need only update the pseudo-name and authorization password provided on the resource record 300. Subsequently, when a user of a network terminal 200 initiates communication with the network resource 104 using the original pseudo-name, the authorization server 110 scans the resource records 300,400 for occurrences of the original pseudo-name. After locating the appropriate resource record 300, 400 the authorization server 110 provides the driver administrator layer 408 with the updated pseudo-name and authorization password of the network resource 104, provided that the network terminal 200 is still authorized to communicate with the network resource 104. A network terminal 200 which is not authorized to communicate with the network resource 104 will not receive the updated pseudo-name and authorization password from the authorization server 110 and, consequently, will not be able to communicate with the network resource 104, even if the user of the network terminal 200 knew the network address for the network resource 104.

Further Example Configurations of the Network Resource Control System 100

Referring to FIG. 5a, shown is the network resource control system 100 including a plurality of network terminals 200 in communication with a plurality of network resources 104 via one or more proxy servers 114 (only one is shown for convenience) through a communications network 112 and/or authorization server 110. It is recognised that the communications network 112 can be an intranet, an extranet (e.g. the Internet), a combination of intranet(s) and extranet(s), or any other combination of networks configured for providing electronic communications 220 between the network terminal 200 and the proxy server 114 and between the proxy server 114 and the polling server 116. For example, the network terminal 200 can reside on an intranet 112 connected to an extranet 112 for communication with the proxy server 114. The proxy server 114 can communicate with the polling server 116 also via the extranet 112 and/or via an intranet 112. For example, the proxy server 114 and polling server 116 can be configured on the same computer or can be configured on different computers, as hardware, software, or a combination thereof. The firewall 115 can be hardware, software, or combination thereof positioned between the proxy server 114 and the polling server 116. Although the following discussion is an example of communication through the firewall 115, it is also recognised that the network terminals 200 can use the system 100 to communicate with network resources 104 not through a firewall 115 and therefore may (or may not) be accessed in conjunction with the proxy server 114. For example, the network resource 104 may not be protected by a firewall 115 even though the network terminal 00 and the network resource 104 are on different network 112 segments (e.g. one on protected and one on unprotected). Alternatively, the network resource 104 and the network terminal 200 could both be on a network 112 segment (e.g. the same protected or unprotected) behind a common firewall 115. Alternatively, the network resource 104 and the network terminal 200 could both be on a network 112 segment (e.g. the same protected or unprotected) in front of a common firewall 115. As such, the network terminal 200 can be configured, for example by the client application 390, to communicate 220 over the network 112 with the resource service 458 (e.g. hosted on the authorization server 110), with the suggested network resource 104 via a proxy server 114 (e.g. sending the application data 221 to an address of the proxy server 114 on the network 112), with the suggested network resource 104 (e.g. sending the application data 221 to an address of the network resource 104 on the network 112), and/or to a resource server 118 (e.g. sending the application data 221 to an address of the resource server 118 on the network 112).

Firewall 115

In network 112 communication pathways involving a firewall, the firewall 115 can be defined as a dedicated appliance, and/or software running on a computer, which inspects network traffic 220 passing through it, and denies or permits passage of the network communications 220 based on a set of rules/criteria. For example, the firewall 115 can be associated with the computer configured for the polling server 116 or can be associated with the computer configured for both the polling server 116 and the proxy server 114. In terms of the network system 100, the firewall 115 is placed between a protected network 112 and an unprotected (or protected to a lesser degree than the protected network) network 112 and acts like a gate to protect assets to provide that nothing/limited private goes out and nothing/limited malicious comes in. Access and passage of communications 220 through the firewall 115 can be performed via a number of access ports in the firewall 115 as is known in the art. Accordingly, the firewall. 115 is configured to block unauthorized access to the polling server 116 and downstream components of resource server 118 and/or network resource(s) 104 associated with the polling server 116, while permitting authorized communications 220 as initiated from the polling server 116 to the proxy server 114 from inside of the firewall 115 (i.e. polling initiated by the polling server 116 in the direction of from the protected network 112 to the unprotected network 112). It is recognised that the firewall 115 is a network entity (i.e. a configured device or set of devices) which permits or denies access to the polling server 116 by computer applications/servers located outside of the firewall 115, based upon a set of rules and other network protection criteria. It is recognised that all messages and communications 220 entering or leaving the polling server 116 pass through the firewall 115, which examines each message and communications 220 and blocks those that do not meet the specified security criteria of the firewall 115 configuration.

In view of the above, the firewall's 115 basic task is to regulate some of the flow of traffic 220 between computer networks 112 having different trust levels (e.g. the proxy server 114 is on a network 112 of a lower trust level than the network 112 that the polling server 116 is on). Typical examples are the Internet 112 which is a zone with no trust and an internal network 112 which is a zone of higher trust. A zone with an intermediate trust level, situated between the Internet 112 and a trusted internal network 112, can be referred to as a "perimeter network" 112 or Demilitarized zone (DMZ). Accordingly, an unprotected network 112 may have some protection (i.e. a specified level of trust) or no protection (i.e. no level of trust) that is lower protection (i.e. a lower specified level of trust) than the specified level of trust of the protected network 112.

There are several types of firewall 115 techniques, such as but not limited to: packet filtering that inspects each packet 220 passing through the network 112 and accepts or rejects it based on user-defined rules associated with the firewall 115 configuration; application gateway that applies security mechanisms to specific applications, such as FTP and Telnet servers; circuit-level gateway that applies security mechanisms when a TCP or UDP connection for the communications 220 is established, such that once the connection has been made, the packets 220 can flow between the servers 114,116 without further checking; and Proxy server based that intercepts all messages 220 entering and leaving the network 112, such that the proxy server 114 effectively hides the true network addresses of the polling server 116 and/or the print server 118 and network resources 104.

Proxy Server 114

The electronic communications 20 forwarded to the proxy server 114 (e.g. from the network terminal 200) can include network resource data 221 for consumption (i.e. processing) by the network resource 104 in relation to the stored network resource data 221 available in a storage 224 (e.g. queue, buffer, etc.) or that network resource data 221 already sent to the network resource 104 (or intervening network resource server 118) from the polling server 116. It is also recognised that the polling server 116 can contain a storage 225 for storing network resource data 221 obtained from the proxy server 114.

The storage 224,225 can be configured as keeping the stored electronic communications 220 in order and the principal (or only) operations on the stored electronic communications 220 are the addition of the stored electronic communications 220 and removal of the stored electronic communications 220 from the storage 224,225 (e.g. FIFO, FIAO, etc.). For example, the storage 224,225 can be a linear data structure for containing and subsequent accessing of the stored electronic communications 220 and/or can be a non-linear data structure for containing and subsequent accessing of the stored electronic communications 220.

Further, the storage 224,225 receives various entities such as data 221 that are stored and held to be processed later. In these contexts, the storage 224,225 can perform the function of a buffer, which is a region of memory used to temporarily hold data 221 while it is being moved from one place to another (i.e. between the network terminal 200 to the network resource 104). Typically, the data 221 is stored in the memory when moving the data 221 between processes within/between one or more computers. It is recognised that the storage 221 can be implemented in hardware, software, or a combination thereof. The storage 224,225 is used in the network system 100 when there is a difference between the rate/time at which data 221 is received (e.g. from the network terminal 200) and the rate/time at which the data 221 can be processed (e.g. ultimately by the network resource 104).

In terms of a server, it is recognised that the proxy server 114 (as well as the polling server 116, resource server 118, administration server 108 and/or authorization server 110) can be configured as hardware, software, or typically a combination of both hardware and software to provide a network 112 entity that operates as a socket listener. It is recognised that any computerised process that shares a resource (e.g. data 221) to one or more client processes can be classified as a server in the network system 100. The term server can also be generalized to describe a host that is deployed to execute one or more such programs, such that the host can be one or more configured computers that link other computers or electronic devices together via the network 112. The servers 114,116,118, 108, 110 can provide specialized services across the network 112, for example to private users inside a large organization or to public users via the Internet 112. In the network system 100, the servers can have dedicated functionality such as proxy servers, print/resource servers, and polling servers. Enterprise servers are servers that are used in a business context and can be run on/by any capable computer hardware. In the hardware sense, the word server typically designates computer models intended for running software applications under the heavy demand of a network 112 environment. In this client-server configuration one or more machines, either a computer or a computer appliance, share information with each other with one acting as a host for the other. While nearly any personal computer is capable of acting as a network server, a dedicated server will contain features making it more suitable for production environments. These features may include a faster CPU, increased high-performance RAM, and typically more than one large hard drive. More obvious distinctions include marked redundancy in power supplies, network connections, and even the servers themselves.

Polling Server 116

Referring again to Figure 5a, the polling server 116 provides the communication through the firewall 115 for facilitating communication of any data 221 in the storage 224 of the polling server 114 towards the network resources 104 and/or resource server 118. It is recognised that the polling server 116 polls the proxy server 114 for any data 221 applicable to the polling server 116 (e.g. those data 221 communications associated with the server 118 and/or network resources 104 associated with the respective polling server 116).

Figure 7:
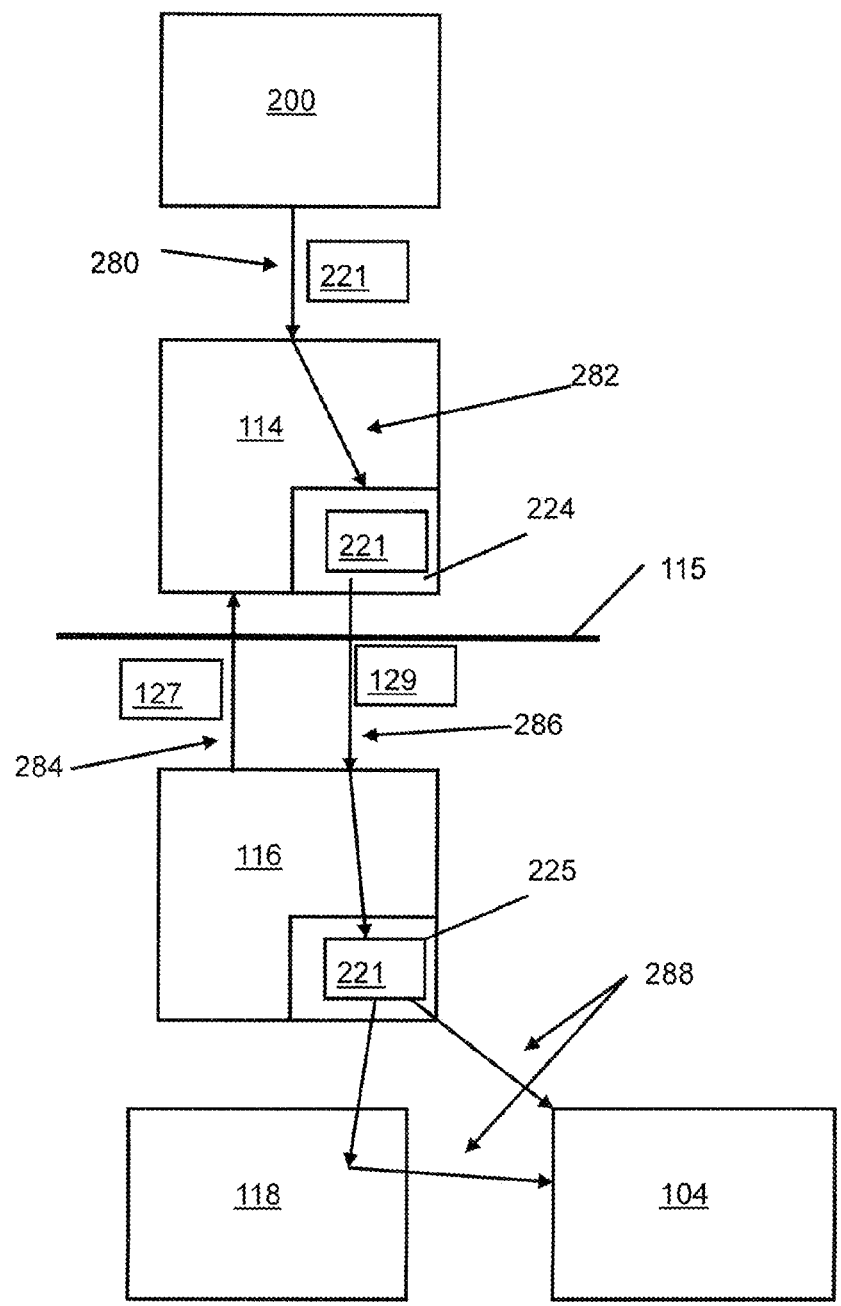
FIG. 7 shows a stage polling mechanism of FIG. 1.

Referring to FIG. 7, in effect, the transfer of resource data 221 from the network terminal 200 to the network resource 104 is done in stages over the communication network 112. One stage 280 is to transmit the network resource data 104 from the network terminal 200 to the proxy server 114, for subsequent delivery to the appropriate network resource 104 selected/confirmed by the network terminal 200 as the ultimate destination for processing/consumption (e.g. printing, viewing, etc. of the resource data 221). Another stage 282 is receipt of the network resource data 221 by the proxy server 114 and storage of the received resource data 221 in the storage 224. Another stage 284 is for the polling server 116 to submit a poll message 127 initiated from inside of the firewall 115 through an opened port in the firewall 115 to the proxy server 114 requesting the availability/presence in the storage 224 of any resource data 221 directed to any of the network resources 104 associated with the polling server 116.

Another stage 286 is for the proxy server 114 to identify in the storage 224 any appropriate resource data 221 suitable in response to the poll message 127 and to send the suitable resource data 221 to the polling server 116 in a response message 129 to the poll message 127. Otherwise, in the absence of suitable resource data 221 present in the storage 224 upon receipt of the poll message 127, the proxy server 114 could send a null response 129 indicating that no suitable resource data 221 is present for the polling server 116. At stage 288, the polling server 116 sends directly any resource data 221 (received from the proxy server 114) to the appropriate network resource 104 specified as a target of the network resource data 221 for consumption/processing. Alternatively, at stage 288, the polling server 116 sends indirectly via the resource server 118 any resource data 221 (received from the proxy server 114) to the appropriate network resource 104 specified as a target of the network resource data 221 for consumption/processing.

In the above transmission stage 286 of the network resource data 221 to the polling server 116, the subsequent stage transmission 288 to the network resource 104 occurs as a result of the poll message 127 submitted to the proxy server 114. This procedure of stages 280,282,284,286,288 for getting the network resource data 221 from the network terminal 200 to the network resource 104 can be referred to as stage polling. An example of the recipient of the network resource data 221 being different from the user of the network terminal 200 is where a user of the network terminal 200 is located remotely from the recipient user and the network resource 104, such that the recipient user is local to the network resource 104 and has physical access to the network resource 104. One example of this is where an assistant sends via their computer 200 an email 221 to their boss staying at a hotel for subsequent pickup once printed off at the hotel printer 104.

Example Operation of the System 100

Figure 10:
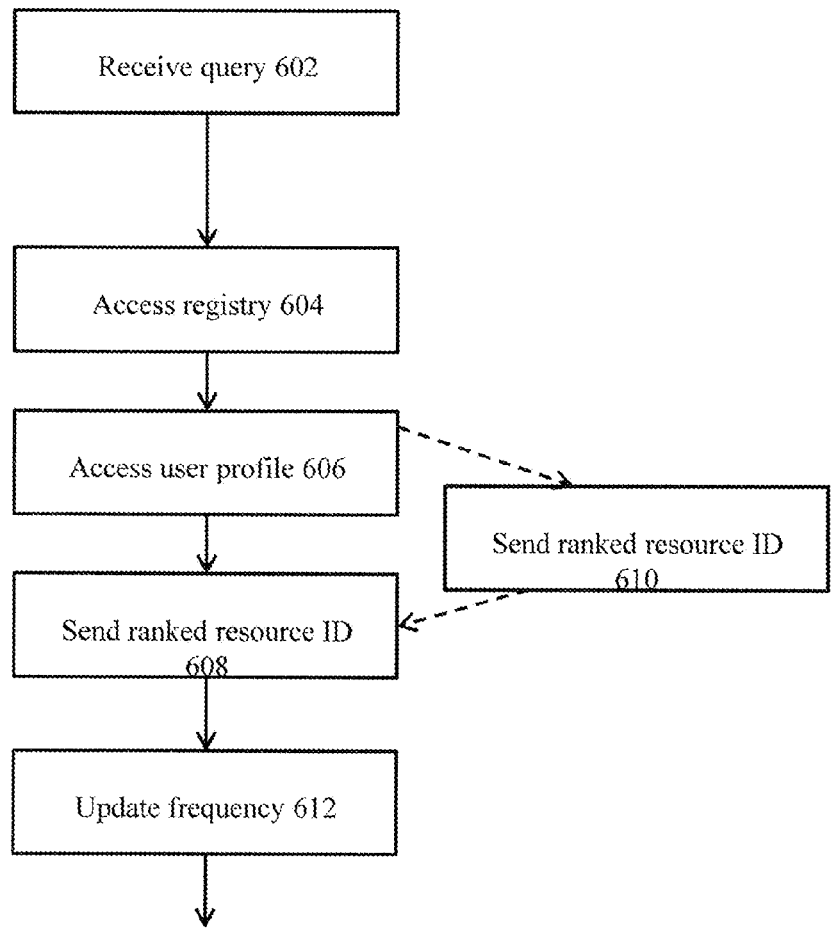
FIG. 10 shows an example operation of the system of FIG. 1.

Referring to FIG. 10 and FIGS. 5a,b, providing access of a user to the network resources 104 over the communications network 112 can include the step 602 of receiving by the resource service 458 (e.g. from the client application 390) the access query 220 from the network terminal 200 identifying the user and associated with submission of application data 221 for processing by a network resource of the network resources 104. At step 604, the resource service 458 accesses the resource registry 106 including stored resource records 300 associated with each of the network resources 104 and a stored user profile 450 containing a list of network resources 104 such that the network resources 104 have a ranking 454 relative to each other based at least in part on user behaviour with respect to usage of each of the network resources 104, the user profile 450 associated with the user such that the list of network resources 104 contains the network resources 104 previously accessed by the user. At step 606, the resource service 458 can access the user profile 450 to identify a suggested network resource 104 from the list in view of the relative ranking 454 (e.g. the highest ranked network resource 104 of the list), and at step 608 send identification 452 of the suggested network resource 104 to the network terminal 200 in response to the access query 220.

Additional optional steps can include at step 610 dynamically determining the ranking 454 of each of the network resources 104 based on a plurality of resource parameters 456 associated with at least one of the application data 221, the user, or an operational characteristic (e.g. printer type, paper type, cost of usage, location of resource, etc.) of one or more of the network resources 104. It is recognised that the ranking 454 can be a weighted combination of the plurality of resource parameters 456 based on a weight 457 assigned to each of the resource parameters 456. The weight 457 can be stored in the user profile 450 (e.g. on the authorization server 110, the network terminal 200, the resource registry 106, etc.) or otherwise in the operating instructions of the resource service 458. The resource parameter 456 of the plurality of resource parameters 456 used by the resource service 458 in dynamic ranking determination can be a frequency of historical usage of each of the network resources 104 by the user. The frequency of usage for each of the network resources 104 can be stored in the user profile 450.

Another optional step 612 is updating the frequency of usage of the suggested network resource 104 when the suggested network resource 104 is selected by the user (e.g. via options 460,462). It is recognised that the access query 220 can be received from the client application 390 of the network service 458 over the communications network 112. As discussed above, the further resource parameters 456 of the plurality of resource parameters 456 considered by the resource service 458 in determining ranking 454 can be geographical coordinates 109 based on a physical location of the network terminal. A further resource parameter 456 considered can be network 112 segment coordinates based on a network location of the network terminal 200. As discussed, the network resources 104 in the user profile 450 can include one or more printers. As well, the network resources 104 can include any of a facsimile machine, an image server, a file server or a scanner.

General Server 108,110,114,116,118 Configuration Examples

In view of the above descriptions of storage (e.g. storage 210,224,225) for the servers 108,110,114,116,118, the storage can be configured as keeping the stored data (e.g. data 221 and related registry 106 data-records 300,400) in order and the principal (or only) operations on the stored data are the addition of and removal of the stored data from the storage (e.g. FIFO, FIAO, etc.). For example, the storage can be a linear data structure for containing and subsequent accessing of the stored data and/or can be a non-linear data structure for containing and subsequent accessing of the stored data.

Further, the storage receives various entities such as data that are stored and held to be processed later. In these contexts, the storage can perform the function of a buffer, which is a region of memory used to temporarily hold data while it is being moved from one place to another (i.e. between the servers 114,116 towards the network device 104). Typically, the data is stored in the memory when moving the data between processes within/between one or more computers. It is recognised that the storage can be implemented in hardware, software, or a combination thereof. The storage is used in the network system 100 when there is a difference between the rate/time at which data is received and the rate/time at which the data can be processed (e.g. ultimately by the network resource server 114,116 and/or device 104).

Further, it will be understood by a person skilled in the art that the memory/storage described herein is the place where data can be held in an electromagnetic or optical form for access by the computer processors/modules. There can be two general usages: first, memory is frequently used to mean the devices and data connected to the computer through input/output operations such as hard disk and tape systems and other forms of storage not including computer memory and other in-computer storage. Second, in a more formal usage, memory/storage has been divided into: (1) primary storage, which holds data in memory (sometimes called random access memory or RAM) and other "built-in" devices such as the processor's L1 cache, and (2) secondary storage, which holds data on hard disks, tapes, and other devices requiring input/output operations. Primary storage can be faster to access than secondary storage because of the proximity of the storage to the processor or because of the nature of the storage devices. On the other hand, secondary storage can hold much more data than primary storage. In addition to RAM, primary storage includes read-only memory (ROM) and L1 and L2 cache memory. In addition to hard disks, secondary storage includes a range of device types and technologies, including diskettes, Zip drives, redundant array of independent disks (RAID) systems, and holographic storage. Devices that hold storage are collectively known as storage media.

A database is one embodiment of memory as a collection of information that is organized so that it can easily be accessed, managed, and updated. In one view, databases can be classified according to types of content: bibliographic, full-text, numeric, and images. In computing, databases are sometimes classified according to their organizational approach. The most prevalent approach is the relational database, a tabular database in which data is defined so that it can be reorganized and accessed in a number of different ways. A distributed database is one that can be dispersed or replicated among different points in a network. An object-oriented programming database is one that is congruent with the data defined in object classes and subclasses. As such, the user profile 450 can also be distributed or on different locations taking into account distributed storage. Computer databases typically contain aggregations of data records or files, such as sales transactions, product catalogs and inventories, and customer profiles. Typically, a database manager provides users the capabilities of controlling read/write access, specifying report generation, and analyzing usage. Databases and database managers are prevalent in large mainframe systems, but are also present in smaller distributed workstation and mid-range systems such as the AS/400 and on personal computers. SQL (Structured Query Language) is a standard language for making interactive queries from and updating a database such as IBM's DB2, Microsoft's Access, and database products from Oracle, Sybase, and Computer Associates.

Memory/storage can also be defined as an electronic holding place for instructions and data that the computer's microprocessor can reach quickly. When the computer is in normal operation, its memory usually contains the main parts of the operating system and some or all of the application programs and related data that are being used. Memory is often used as a shorter synonym for random access memory (RAM). This kind of memory is located on one or more microchips that are physically close to the microprocessor in the computer.

In terms of a server, it is recognised that the server 108,110,114,116,118 can be configured as hardware, software, or typically a combination of both hardware and software to provide a network entity that operates as a socket listener. It is recognised that any computerised process that shares a resource (e.g. data) to one or more client processes can be classified as a server in the network system 100. The term server can also be generalized to describe a host that is deployed to execute one or more such programs, such that the host can be one or more configured computers that link other computers or electronic devices together via the network 112. The servers 108,110,114,116,118 can provide specialized services across the network 112, for example to private users inside a large organization or to public users via the Internet 112. In the network system 100, the servers can have dedicated functionality and/or can share functionality as described. Enterprise servers are servers that are used in a business context and can be run on/by any capable computer hardware. In the hardware sense, the word server typically designates computer models intended for running software applications under the heavy demand of a network 112 environment. In this client-server configuration one or more machines, either a computer or a computer appliance, share information with each other with one acting as a host for the other. While nearly any personal computer is capable of acting as a network server, a dedicated server will contain features making it more suitable for production environments. These features may include a faster CPU, increased high-performance RAM, and typically more than one large hard drive. More obvious distinctions include marked redundancy in power supplies, network connections, and even the servers themselves.

Example of Server 108,110,114,116, 118 System

Figure 9:
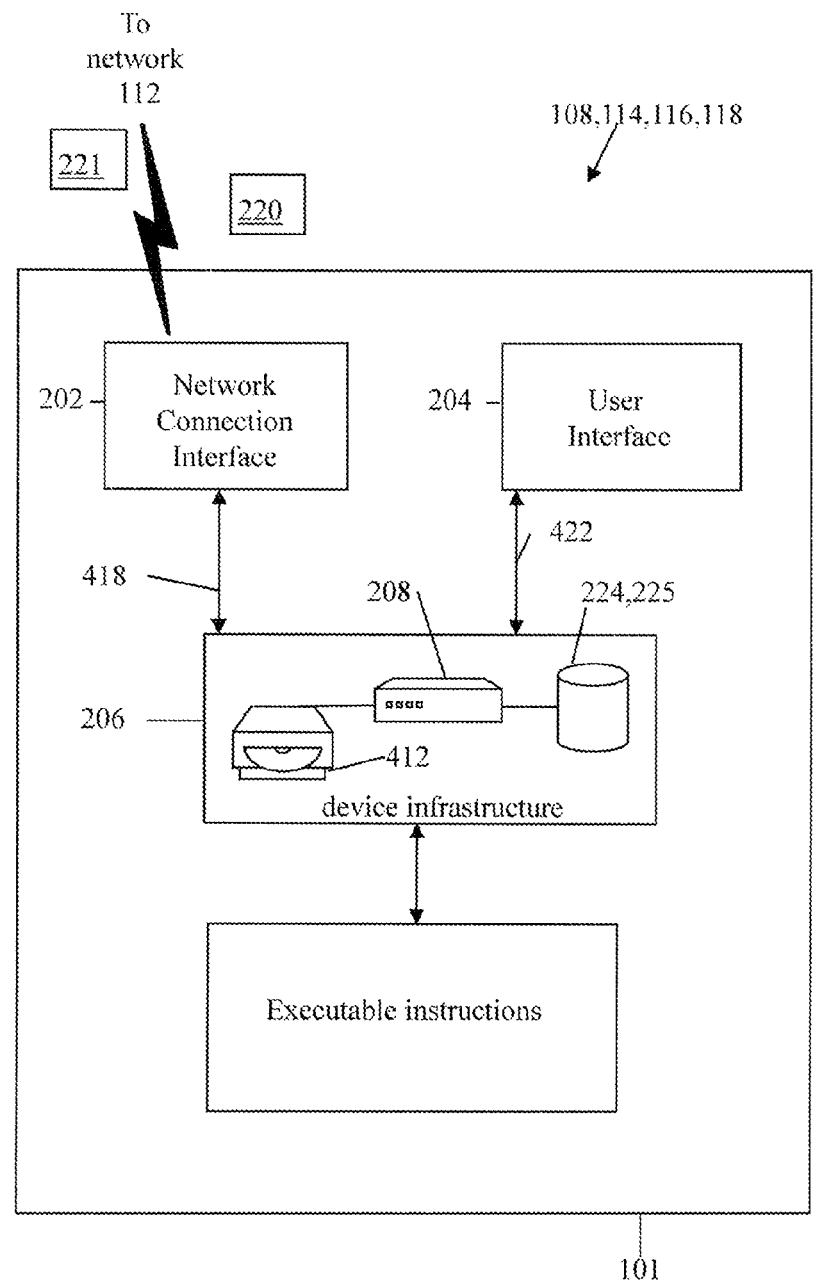
FIG. 9 shows an example configuration of servers of the system of FIGS. 1 and 5a,b.

Referring to FIG. 9, a computing device 101 of the server 108,110,114,116, 118 can include a network connection interface 202, such as a network interface card or a modem, coupled via connection 418 to a device infrastructure 206. The connection interface 202 is connectable during operation of the devices to the network 112 (e.g. an intranet and/or an extranet such as the Internet), which enables the devices to communicate with each other (e.g. that of servers 114,116 with respect to one another and the devices 104) as appropriate. The network 112 can support the communication of the data 221 and communications 220, and the related content.

Referring again to FIG. 9, the device 101 can also have a user interface 204, coupled to the device infrastructure 206 by connection 422, to interact with a user (e.g. server administrator—not shown). The user interface 204 can include one or more user input devices such as but not limited to a QWERTY keyboard, a keypad, a stylus, a mouse, a microphone and the user output device such as an LCD screen display and/or a speaker. If the screen is touch sensitive, then the display can also be used as the user input device as controlled by the device infrastructure 206.

Referring again to FIG. 9, operation of the device 101 is facilitated by the device infrastructure 206. The device infrastructure 206 includes one or more computer processors 208 and can include an associated memory (e.g. a random access memory 224,225). The computer processor 208 facilitates performance of the device 101 configured for the intended task (e.g. of the respective module(s) of the server 114,116) through operation of the network interface 202, the user interface 204 and other application programs/hardware of the device 101 by executing task related instructions. These task related instructions can be provided by an operating system, and/or software applications located in the memory, and/or by operability that is configured into the electronic/digital circuitry of the processor(s) 208 designed to perform the specific task(s). Further, it is recognized that the device infrastructure 206 can include a computer readable storage medium 412 coupled to the processor 208 for providing instructions to the processor 208 and/or to load/update the instructions. The computer readable medium 412 can include hardware and/or software such as, by way of example only, magnetic disks, magnetic tape, optically readable medium such as CD/DVD ROMS, and memory cards. In each case, the computer readable medium 412 may take the form of a small disk, floppy diskette, cassette, hard disk drive, solid-state memory card, or RAM provided in the memory module 412. It should be noted that the above listed example computer readable mediums 412 can be used either alone or in combination.

Further, it is recognized that the computing device 101 can include the executable applications comprising code or machine readable instructions for implementing predetermined functions/operations including those of an operating system and the server 114,116 modules, for example. The processor 208 as used herein is a configured device and/or set of machine-readable instructions for performing operations as described by example above. As used herein, the processor 208 may comprise any one or combination of, hardware, firmware, and/or software. The processor 208 acts upon information by manipulating, analyzing, modifying, converting or transmitting information for use by an executable procedure or an information device, and/or by routing the information with respect to an output device. The processor 408 may use or comprise the capabilities of a controller or microprocessor, for example. Accordingly, any of the functionality of the server 114,116 (e.g. modules) may be implemented in hardware, software or a combination of both. Accordingly, the use of a processor 408 as a device and/or as a set of machine-readable instructions is hereafter referred to generically as a processor/module for sake of simplicity. Further, it is recognised that the server 114,116 can include one or more of the computing devices 101 (comprising hardware and/or software) for implementing the modules, as desired.

It will be understood in view of the above that the computing devices 101 of the servers 114,116 may be, although depicted as a single computer system, may be implemented as a network of computer processors, as desired.

We claim:

1. A method comprising:

receiving, by a server, a network resource access request from a mobile device of a user, the network resource access request including resource parameters related to application data generated at the mobile device and to be processed by a network resource;

responsive to receiving the network resource access request, dynamically ranking, by the server, a list of network resources that best match the network resource access request, based on the resource parameters related to the application data, based on a profile of the user, and based on a current location and a currently connected network segment of the mobile device, regardless of whether any network resource is currently available, a top ranked network resource of the list being unavailable to process the application data generated at the mobile device;

returning, by the server, the list of network resources to the mobile device, the mobile device sending the application data to the network resource of the list selected by the user at the mobile device;

receiving, by the server from the mobile device, identification of the network resource of the list selected by the user at the mobile device;

determining, by the server, an unavailability status of the top ranked network resource that is unavailable;

in response to determining that the unavailable status of the top ranked network resource is that the top ranked network resource is temporarily unavailable, determining, by the server, not to update the ranked list; and in response to determining that the unavailability status of the top ranked network resource is that the top ranked network resource is indefinitely unavailable, updating, by the server, the ranked list of network resources to favor the selected network resource over the top ranked network resource within the ranked list, the top ranked network resource remaining within the list.

2. The method of claim 1, wherein ranking the list of network resources comprises:

determining that more than one network resource are equally top ranked; and in response to determining that more than one network resource are equally top ranked, applying an additional parameter of the profile of the user to reduce a number of top ranked network resources within the list to one network resource.

3. The method of claim 1, wherein the list of network resources is dynamically ranked in that the list of network resources is not ranked until the network resource access request has been received from the mobile device.

4. The method of claim 1, wherein the network resources are network-connected printing devices, the network resource of the list selected by the user printing the application data sent by the mobile device.

5. A non-transitory computer-readable data storage medium storing program code executable by a server to perform processing comprising:

receiving a network resource access request from a mobile device of a user, the network resource access request including resource parameters related to application data generated at the mobile device and to be processed by a network resource;

responsive to receiving the network resource access request, dynamically ranking, a list of network resources that best match the network resource access request, based on the resource parameters related to the application data, based on a profile of the user, and based on a current location and a currently connected network segment of the mobile device, regardless of whether any network resource is currently available, a top ranked network resource of the list being unavailable to process the application data generated at the mobile device;

returning the list of network resources to the mobile device, the mobile device sending the application data to the network resource of the list selected by the user at the mobile device;

receiving, from the mobile device, identification of the network resource of the list selected by the user at the mobile device;

determining an unavailability status of the top ranked network resource that is unavailable;

in response to determining that the unavailable status of the top ranked network resource is that the top ranked network resource is temporarily unavailable, determining not to update the ranked list; and in response to determining that the unavailability status of the top ranked network resource is that the top ranked network resource is indefinitely unavailable, updating the ranked list of network resources to favor the selected network resource over the top ranked network resource within the ranked list, the top ranked network resource remaining within the list.

6. The non-transitory computer-readable data storage medium of claim 5, wherein ranking the list of network resources comprises:

determining that more than one network resource are equally top ranked; and in response to determining that more than one network resource are equally top ranked, applying an additional parameter of the profile of the user to reduce a number of top ranked network resources within the list to one network resource.

7. The non-transitory computer-readable data storage medium of claim 5, wherein the list of network resources is dynamically ranked in that the list of network resources is not ranked until the network resource access request has been received from the mobile device.

8. The non-transitory computer-readable data storage medium of claim 5, wherein the network resources are network-connected printing devices, the network resource of the list selected by the user printing the application data sent by the mobile device.

9. A server computing device, comprising:

a processor; and a non-transitory computer-readable data storage medium storing program code executable by the processor to:

receive a network resource access request from a mobile device of a user, the network resource access request including resource parameters related to application data generated at the mobile device and to be processed by a network resource;

responsive to receiving the network resource access request, dynamically rank, a list of network resources that best match the network resource access request, based on the resource parameters related to the application data, based on a profile of the user, and based on a current location and a currently connected network segment of the mobile device, regardless of whether any network resource is currently available, a top ranked network resource of the list being unavailable to process the application data generated at the mobile device;

return the list of network resources to the mobile device, the mobile device sending the application data to the network resource of the list selected by the user at the mobile device;

receive, from the mobile device, identification of the network resource of the list selected by the user at the mobile device;

determine an unavailability status of the top ranked network resource that is unavailable;

in response to determining that the unavailable status of the top ranked network resource is that the top ranked network resource is temporarily unavailable, determine not to update the ranked list; and in response to determining that the unavailability status of the top ranked network resource is that the top ranked network resource is indefinitely unavailable, update the ranked list of network resources to favor the selected network resource over the top ranked network resource within the ranked list, the top ranked network resource remaining within the list.

10. The server computing device of claim 9, wherein the program code is executable by the server to rank the list of network resources by:

determining that more than one network resource are equally top ranked; and in response to determining that more than one network resource are equally top ranked, applying an additional parameter of the profile of the user to reduce a number of top ranked network resources within the list to one network resource.

11. The server computing device of claim 9, wherein the list of network resources is dynamically ranked in that the list of network resources is not ranked until the network resource access request has been received from the mobile device.

12. The server computing device of claim 9, wherein the network resources are network-connected printing devices, the network resource of the list selected by the user printing the application data sent by the mobile device.

* * * * *